United States Patent
Koshiduka et al.

(10) Patent No.: US 8,310,106 B2
(45) Date of Patent: Nov. 13, 2012

(54) MAGNETIZING INRUSH CURRENT SUPPRESSION DEVICE AND METHOD FOR TRANSFORMER

(75) Inventors: Tadashi Koshiduka, Saitama (JP); Minoru Saito, Kanagawa (JP); Susumu Nishiwaki, Yokohama (JP); Nobuyuki Takahashi, Kanagawa (JP); Koichi Futagami, Yokohama (JP); Yoshimasa Sato, Kawasaki (JP); Tsuyoshi Kokumai, Yokohama (JP); Hiroshi Kusuyama, Yokohama (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 392 days.

(21) Appl. No.: 12/516,717

(22) PCT Filed: Nov. 29, 2007

(86) PCT No.: PCT/JP2007/001328
§ 371 (c)(1),
(2), (4) Date: Jan. 15, 2010

(87) PCT Pub. No.: WO2008/065757
PCT Pub. Date: Jun. 5, 2008

(65) Prior Publication Data
US 2010/0141235 A1 Jun. 10, 2010

(30) Foreign Application Priority Data

Nov. 29, 2006 (JP) ................................. 2006-321624
Nov. 29, 2007 (JP) ................................. 2007-309398

(51) Int. Cl.
*H01F 13/00* (2006.01)
*H01F 27/42* (2006.01)
*H02P 9/12* (2006.01)

(52) U.S. Cl. ............................ 307/101; 361/35; 307/125
(58) Field of Classification Search .................. 307/101, 307/115, 116, 125; 361/35
See application file for complete search history.

(56) References Cited

U.S. PATENT DOCUMENTS

| | | | |
|---|---|---|---|
| 5,627,712 A * | 5/1997 | Wilkinson | ...................... 361/63 |
| 6,493,203 B1 | 12/2002 | Ito et al. | |
| 2004/0124814 A1 | 7/2004 | Tsutada et al. | |

FOREIGN PATENT DOCUMENTS

| | | |
|---|---|---|
| JP | 2001 218354 | 8/2001 |
| JP | 2002 075145 | 3/2002 |
| JP | 2004 208394 | 7/2004 |

OTHER PUBLICATIONS

Brunke, J. H. et al., "Elimination of Transformer Inrush Currents by Controlled Switching—Part I: Theoretical Considerations", IEEE Transactions on Power Delivery, vol. 16, No. 2, pp. 276-280 (2001).

* cited by examiner

*Primary Examiner* — Carlos Amaya
(74) *Attorney, Agent, or Firm* — Oblon, Spivak, McClelland, Maier & Neustadt, L.L.P.

(57) ABSTRACT

To suppress the magnetizing inrush current occurring when supplying power of three phases of the transformer are performed simultaneously using three single-phase circuit breakers or a non-phase segregated operation-type circuit breaker, without providing a circuit breaker with a resistor or other equipment. A magnetizing inrush current suppression method for transformer suppresses a magnetizing inrush current occurring at the start of energizing of a three-phase transformer 300, when a three-phase power supply 100 is input to a terminal of each phase by means of a three-phase circuit breaker 200. In the method, by integrating phase voltages or line-to-line voltages on the primary side or the secondary side or the tertiary side when three-phase AC voltages are applied in a steady state to the transformer 300, steady-state magnetic flux 4, 5, 6 for each phase of the transformer is calculated, and the polarity and magnitude of the residual magnetic flux 7, 8, 9 of each phase of the transformer after the circuit breaker 200 shuts off the transformer are calculated, and the three-phase circuit breaker is caused to close simultaneously in a region 13 in which three phases overlap, each of the three phases having the polarity of the steady-state magnetic flux 4, 5, 6 equal to the polarity of the residual magnetic flux 7, 8, 9 for each phase of the transformer.

30 Claims, 22 Drawing Sheets

Phase sequence relation on Y side and Δ side is +30°

Phase sequence relation on Y side and Δ side is −30°

MAGNETIZING INRUSH CURRENT SUPPRESSION DEVICE AND METHOD FOR TRANSFORMER

TECHNICAL FIELD

This invention relates to a magnetizing inrush current suppression device and method for suppressing the magnetizing inrush current which occurs when a power supply is input to a transformer.

BACKGROUND ART

When no-load energizing is performed by supplying power in a state in which there is residual magnetic flux in the transformer core, a large magnetizing inrush current flows. It is widely known that the magnitude of this magnetizing inrush current can be several times the rated load current of the transformer.

When such a large magnetizing inrush current flows, the system voltage fluctuates, and when this voltage fluctuation is large, consumers can be affected.

As a method of the prior art for suppressing magnetizing inrush currents, a magnetizing inrush current suppression method is known in which a circuit breaker with a resistor, formed by connecting in series an closing resistor and a contact, is connected in parallel with any of the circuit breaker main points, and power is turned on to this circuit breaker with a resistor in advance of the circuit breaker main point (see for example Patent Document 1).

As another method of suppression, a method is known in which, when a three-phase transformer of a directly grounded system is supplied with power using three single-phase circuit breakers, one arbitrary phase is supplied with power in advance, and thereafter the remaining two phases are supplied with power, to suppress magnetizing inrush currents (see for example Non-patent Document 1).

Patent Document 1: Japanese Patent Application Laid-open No. 2002-75145, "Gas Circuit Breaker with Device for Suppression of Magnetizing Inrush Currents"

Non-patent Document 1: IEEE Trans., Vol. 16, No. 2, 2001, "Elimination of Transformer Inrush Currents by Controlled Switching—Part I: Theoretical Considerations"

In the case of the magnetizing inrush current suppression method disclosed in the above-described Patent Document 1 employing a circuit breaker with a resistor, because it is necessary to specially add a circuit breaker with a resistor to the ordinary circuit breaker, in terms of the circuit breaker as a whole, larger equipment size is undeniable.

Moreover, as is well known, there exist non-phase segregated operation-type circuit breakers designed to simultaneously perform circuit breaker open/close operations of three phases using a single operation mechanism; but such non-phase segregated operation-type circuit breakers have the drawback that the magnetizing inrush current suppression method disclosed in Non-patent Document 1 cannot be applied.

On the other hand, as described in the above Non-patent Document 1, it is important that, when suppressing magnetizing inrush currents at the time of supplying power of transformer, the magnitude of the residual magnetic flux when the transformer is shut off be ascertained.

When a circuit breaker shuts off at the zero point the magnetizing current flowing in a no-load transformer installed in a non-effectively grounded system, after shutting off the first phase a zero-phase voltage appears, and after shutting of the second and third phases the zero-phase voltage becomes a DC voltage and remains on the transformer. Consequently when the voltage to ground at each of the transformer terminals on the side shut off by the circuit breaker is being measured using a voltage measuring device, the above-described DC voltage is measured after shutoff.

The residual magnetic flux in the transformer core can be determined by integration of the voltage. For example, in the case of a Y connection, if the voltages across each terminal and a neutral point are measured and integrated, the residual magnetic flux in the transformer core can be calculated accurately, without being affected by the above-described DC voltage.

However, in general voltage transformers (VTs, PTs) and capacitor type voltage transformers (PDs), and other voltage measuring devices which voltage-divide high voltages for voltage measurement, are connected across the transformer terminals and ground. Such voltage measuring devices are able to measure the voltage to ground at the transformer terminals, and upon integrating these voltages, the integration result includes the above-described DC voltage, so that the integration value diverges, and the residual magnetic flux cannot be accurately determined.

DISCLOSURE OF THE INVENTION

This invention was devised in light of the above-described prior art, and has as an object the provision of a magnetizing inrush current suppression device and method for transformers, which accurately calculates the residual magnetic flux when a transformer installed in an electric power system is shut off by a circuit breaker, and which enables suppression of the magnetizing inrush current occurring when three single-phase circuit breakers are used for simultaneously supplying power to three phases of the transformer, or when a non-phase segregated operation-type circuit breaker is used for supplying power, without providing a circuit breaker with a resistor or other equipment.

In order to attain the above object, the invention of Claim 1 is a magnetizing inrush current suppression method for transformer, to suppress a magnetizing inrush current occurring at the start of energizing of a three-phase transformer the primary windings of which are connected in a Y connection and the secondary windings or tertiary windings of which are Δ-connected, when a three-phase power supply is input to a terminal of each phase of the transformer by means of a three-phase circuit breaker, and is characterized in that, by integrating phase voltages or line-to-line voltages on the primary side or the secondary side or the tertiary side when three-phase AC voltages are applied in a steady state to the transformer, a steady-state magnetic flux for each phase of the transformer is calculated, and the polarity and magnitude of the residual magnetic flux of each phase of the transformer after the circuit breaker shuts off the transformer are calculated, and the three-phase circuit breaker is caused to close simultaneously in a region in which three phases of the transformer overlap, each of the three phases having the polarity of the steady-state magnetic flux equal to the polarity of the residual magnetic flux for each phase of the transformer.

Further, the invention of Claim 7 is a magnetizing inrush current suppression method for transformer, to suppress a magnetizing inrush current occurring at the start of energizing of a three-phase transformer the primary windings of which are connected in a Y connection and the secondary windings or tertiary windings of which are Δ-connected, when a three-phase power supply is input to a terminal of each phase of the transformer by means of a three-phase circuit breaker, and is characterized in that the circuit breaker is opened at least once and the relation between the shutoff phase of the circuit breaker and the residual magnetic flux in the transformer is measured in advance from the voltage measured by a voltage measuring device connected to a primary or secondary or tertiary terminal of the transformer at that time, and when the circuit breaker shuts off the transformer, by controlling the opening phase of the circuit breaker such that the shutoff phase is always the same, the residual magnetic flux in the transformer is estimated from the relation, and when the transformer is subsequently supplied with power, the three-phase circuit breaker is caused to close simultaneously in a region in which three phases of the transformer overlap, each of the three phases having the polarity of the steady-state magnetic flux for each phase obtained when three-phase AC voltages are applied in the steady state to the transformer, which is equal to the polarity of the estimated residual magnetic flux for the each phase.

Further, the inventions of Claims 18 to 21 are a magnetizing inrush current suppression method for transformer, to suppress a magnetizing inrush current occurring at the start of energizing of a three-phase transformer the primary windings of which are connected in a Y connection and the secondary windings or tertiary windings of which are Δ-connected, when a three-phase power supply is input to a terminal of each phase of the transformer by means of a three-phase circuit breaker, and are characterized in that voltages are measured when three-phase AC voltages are applied to the transformer in the steady state and the line-to-line steady-state magnetic flux is determined, the polarity and magnitude of the line-to-line residual magnetic flux of the transformer after the circuit breaker shuts off the transformer are calculated, and the three-phase circuit breaker is caused to close simultaneously in a region in which three phases of the transformer overlap, each of the three phases having the polarity of the line-to-line steady-state magnetic flux of the transformer equal to the polarity of the line-to-line residual magnetic flux. Claims 18 to 21 adopt the following different respective methods as the method of measuring voltages and determining the line-to-line steady-state magnetic flux. In Claim 18, the primary-side phase voltages are measured and converted into line-to-line voltages, and the line-to-line voltages are integrated to calculate the line-to-line steady-state magnetic flux. In Claim 19, the primary-side phase voltages are measured and integrated to calculate the steady-state magnetic flux for each transformer terminal, and the steady-state magnetic flux for each transformer terminal is converted into line-to-line steady-state magnetic flux. In Claim 20, the primary-side line-to-line voltages are measured and integrated to calculate the steady-state magnetic flux for each transformer terminal. In Claim 21, the Δ-connected secondary winding or tertiary winding three-phase voltages to ground are measured and integrated to calculate the line-to-line steady-state magnetic flux for the transformer.

Further, the invention of Claim 24 is a magnetizing inrush current suppression method for transformer, to suppress a magnetizing inrush current occurring at the start of energizing of a three-phase transformer the primary windings of which are connected in a Y connection and the secondary windings or tertiary windings of which are Δ-connected, when a three-phase power supply is input to a terminal of each phase of the transformer by means of a three-phase circuit breaker, and is characterized in that the circuit breaker is opened at least once and the relation between the shutoff phase of the circuit breaker and the residual magnetic flux in the transformer is measured in advance from the voltage measured by a voltage measuring device connected to a primary or secondary or tertiary terminal of the transformer at that time, and when the circuit breaker shuts off the transformer, by controlling the opening phase of the circuit breaker such that the shutoff phase is always the same, the residual magnetic flux in the transformer is estimated from the relation, and when the transformer is subsequently supplied with power, the three-phase circuit breaker is caused to close simultaneously in a region in which three phases of the transformer overlap, each of the three phases having the polarity of the line-to-line steady-state magnetic flux obtained when three-phase AC voltages are applied in the steady state to the transformer, which is equal to the polarity of the estimated line-to-line residual magnetic flux.

By means of this invention, a transformer magnetizing inrush current suppression device and method can be provided such that the residual magnetic flux when a transformer installed in an electric power system is shut off by a circuit breaker can be accurately calculated, and it is possible to suppress a magnetizing inrush current which occurs when the three phases of the transformer are simultaneously supplied with power by a power supply using three single-phase circuit breakers, or are supplied with power using a non-phase segregated operation-type circuit breaker, without providing a circuit breaker with a resistor or other equipment.

Figure 1:
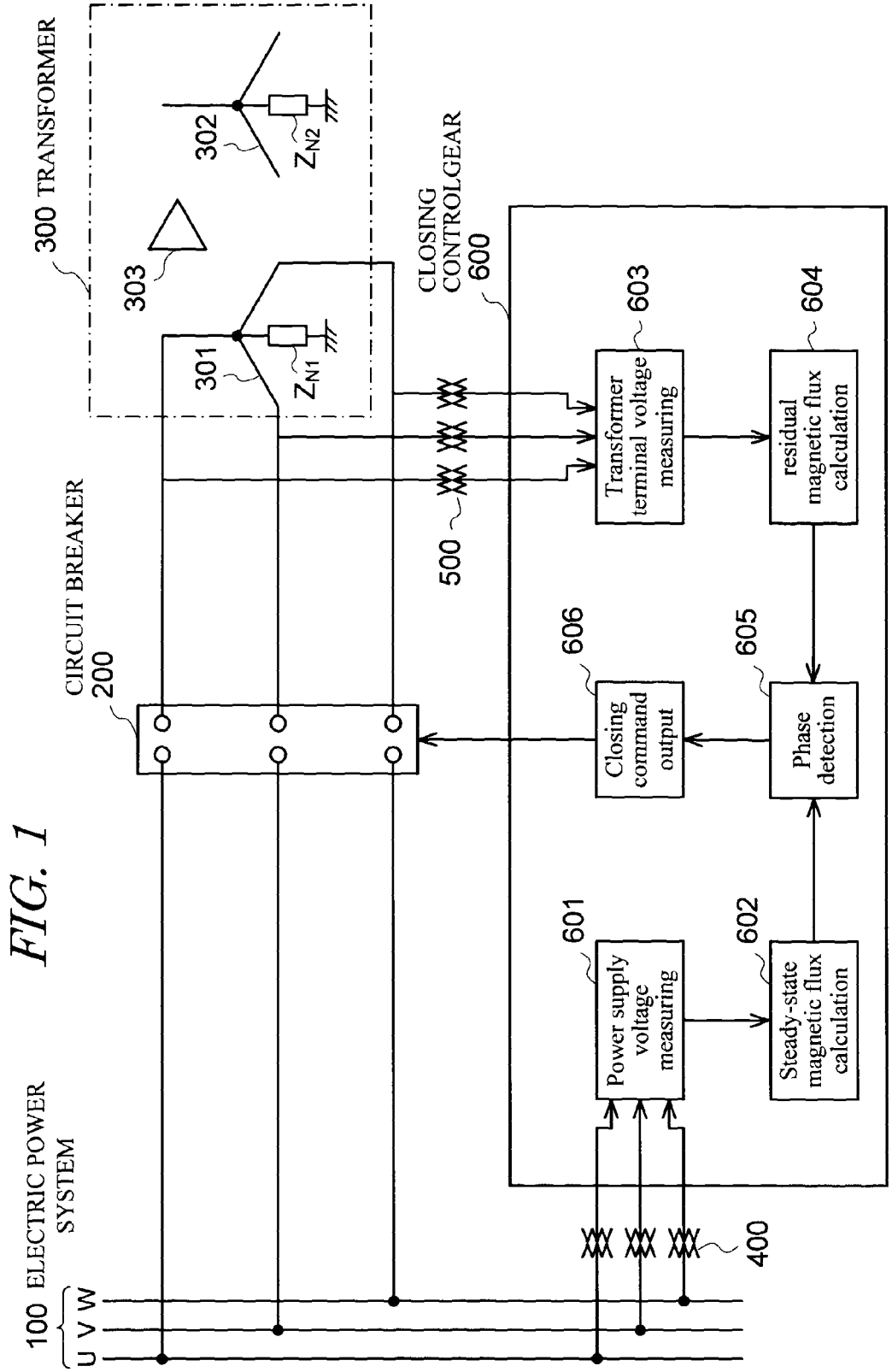
FIG. 1 is a block diagram showing the connection relation between a three-phase transformer, a three-phase circuit breaker, and a magnetizing inrush current suppression device in Embodiment 1 of the invention.

EXPLANATION OF SYMBOLS 1 to 3 Power supply phase voltages (U phase, V phase, W phase)

4 to 6 Steady-state magnetic flux of each transformer phase (U phase, V phase, W phase)

7 to 9 Residual magnetic flux of each phase in transformer cores (U phase, V phase, W phase)

10 to 12 Region in which polarities of residual magnetic flux and steady-state magnetic flux coincide for each phase (U phase, V phase, W phase)

13, 20 to 21 Region in which polarities of residual magnetic flux and steady-state magnetic flux of each phase coincide for all three phases (closing target phase region)

22 to 23 Circuit breaker closing target point 31 to 33 Line-to-line voltage (UV, VW, WU)

34 to 36 Line-to-line steady-state magnetic flux (UV, VW, WU)

37 to 39 Line-to-Line Residual Magnetic Flux (UV, VW, WU)

40 Region in which the polarities of each line-to-line steady-state magnetic flux and residual magnetic flux coincide for three line-to-line combinations (closing target phase region)

41 Circuit breaker closing target point

42 Region in which the polarities of the residual magnetic flux and the steady-state magnetic flux of each phase coincide for all three phases 43 DC voltage 44 to 46 Circuit breaker electrode-to-electrode voltage (U phase, V phase, W phase)

51 to 53 Transformer Δ side line-to-line voltage (UV, VW, WU)

54 to 56 Transformer Δ Side Voltage to Ground for each phase (U phase, V phase, W phase)

57 to 59 Line-to-line residual magnetic flux when shutoff phase is changed (UV, VW, WU)

100 Electric power system
200 Three-phase circuit breaker
300 Three-phase transformer
400 Voltage measuring device
500 Transformer terminal voltage measuring device
500A Transformer terminal voltage measuring device for temporary connection
600 Closing control device
600A Closing/opening control device
601 Power supply voltage measurement means
602 Steady-state magnetic flux calculation means for each phase
602A Line-to-line steady-state magnetic flux calculation means
603 Transformer terminal voltage measurement means
604 Residual magnetic flux calculation means for each phase
604A Line-to-line residual magnetic flux calculation means
605 Phase detection means
606 Closing command output means
607 Shutoff phase-residual magnetic flux relation measuring and holding means
608 Opening phase control means
609 Opening command output means

BEST MODE FOR CARRYING OUT THE INVENTION

Below, embodiments of the invention are explained referring to the drawings. By assigning the same symbols to the same portions throughout the drawings, redundant explanations are omitted as appropriate.

(Embodiment 1)

Figure 2:
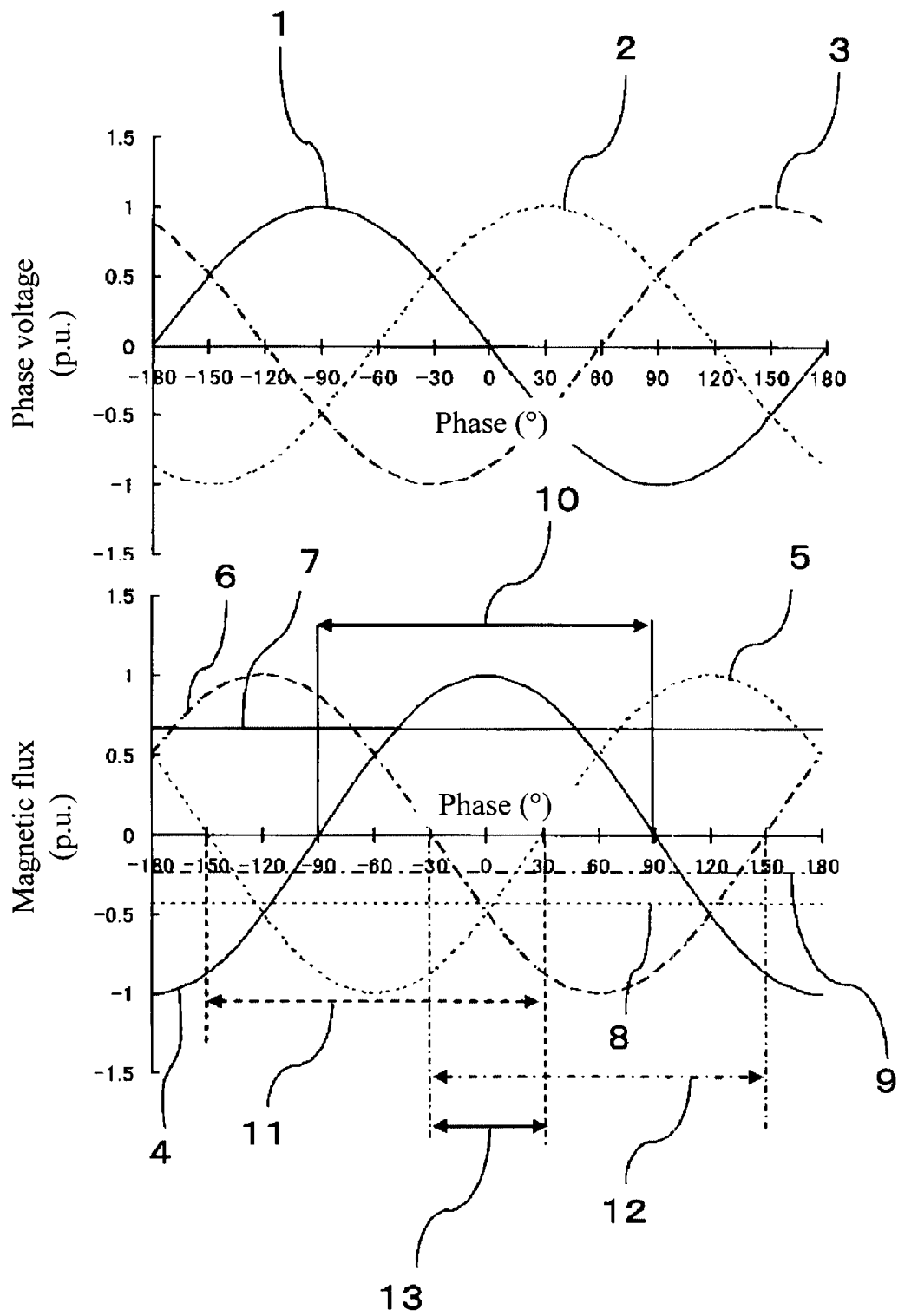
FIG. 2 is a waveform diagram showing the relation between the three-phase power supply voltages, the three-phase transformer steady-state magnetic flux, and the transformer core residual magnetic flux in Embodiment 1 of the invention.
Figure 3:
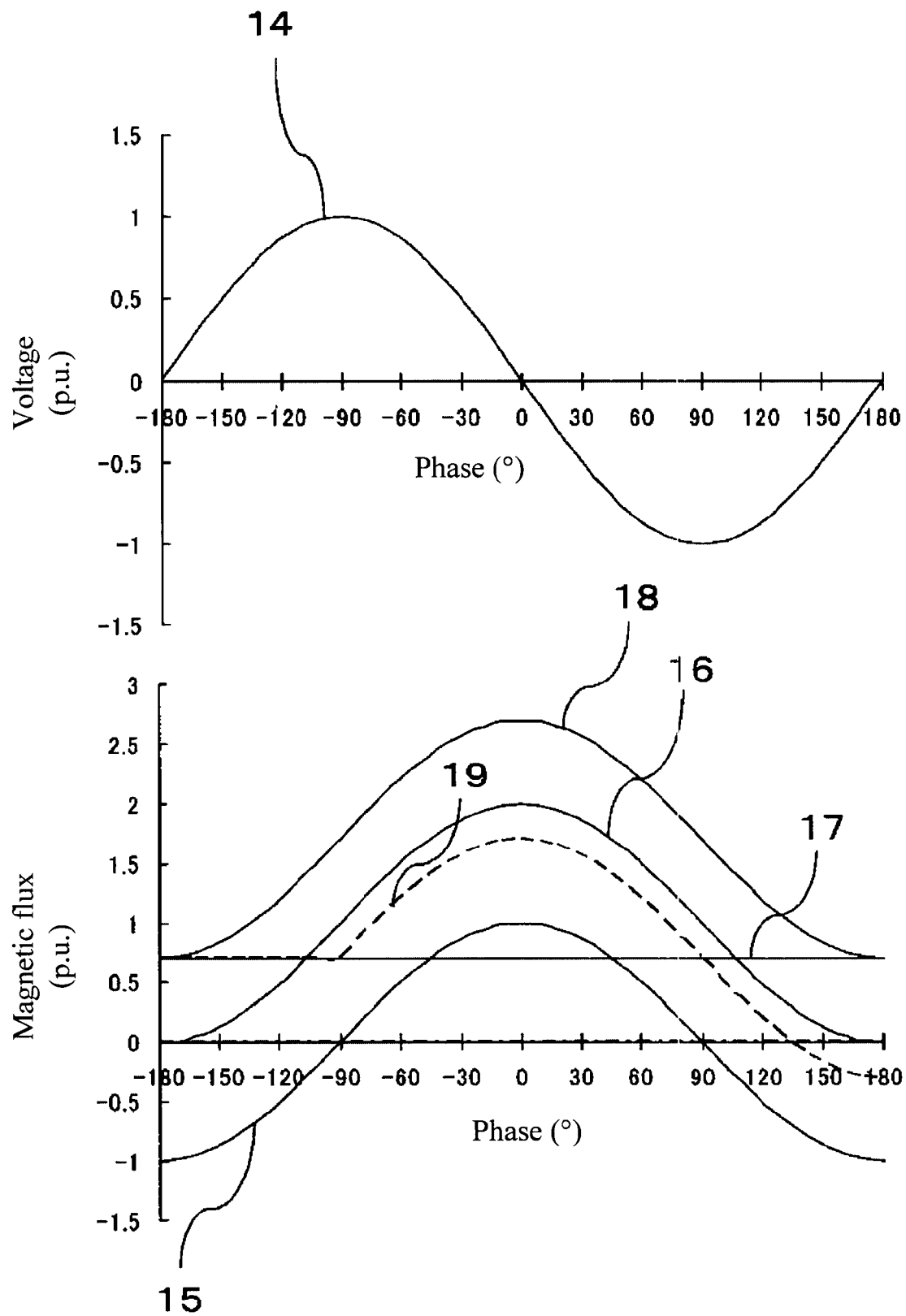
FIG. 3 is a waveform diagram showing residual magnetic flux when a single-phase transformer is supplied with power by a single-phase circuit breaker, the closing phase, and the magnetic flux after supplying power.
Figure 4:
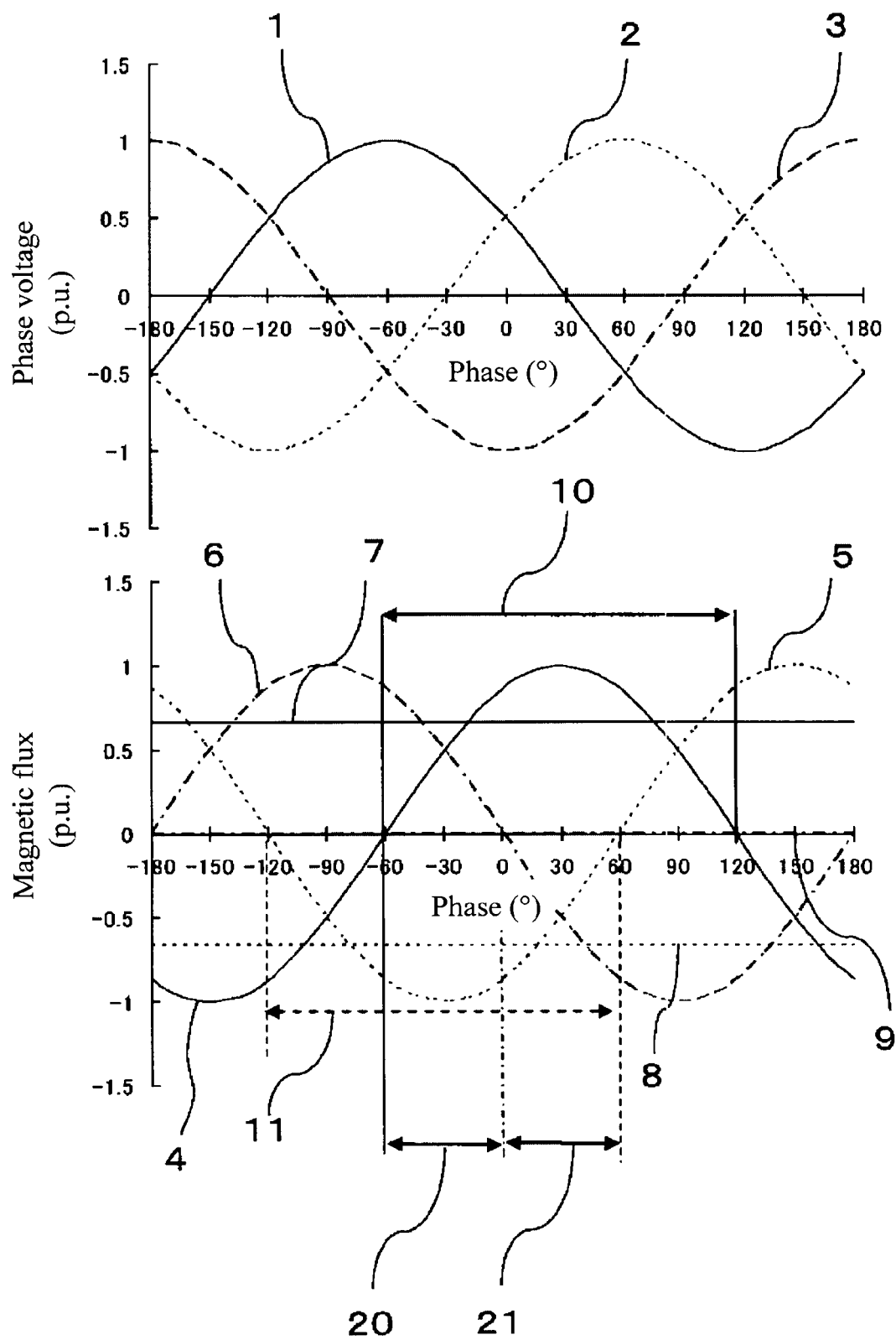
FIG. 4 is a waveform diagram showing a case in which the relation between the power supply phase voltages, transformer steady-state magnetic flux, and transformer core residual magnetic flux is different from that of FIG. 1.

FIG. 1 to FIG. 4 are provided to explain Embodiment 1; in particular, FIG. 1 is a block diagram showing the connection relation between a three-phase transformer, a three-phase circuit breaker, and a magnetizing inrush current suppression device, FIG. 2 is a waveform diagram showing the relation between the power supply phase voltages, steady-state magnetic flux in the transformer, and residual magnetic flux in the transformer core, FIG. 3 is a waveform diagram showing the residual magnetic flux when a single-phase transformer is supplied with power using a single-phase circuit breaker, the closing phase, and the magnetic flux after supplying power, and FIG. 4 is a waveform diagram showing a case in which the relation between the power supply phase voltages, transformer steady-state magnetic flux, and transformer core residual magnetic flux is different from that in FIG. 1.

(Configuration)

In FIG. 1, 100 is a busbar of the power system (also called a power supply busbar), and 200 is a non-phase segregated operation-type circuit breaker (three-phase circuit breaker), the main points of each phase of which are operated simultaneously. 300 is a three-phase transformer, to which the power supply busbar 100 is input or shut off by the three-phase circuit breaker 200; the primary windings 301 and secondary windings 302 are Y-connected, and the tertiary windings 303 are Δ-connected. Zn1 and Zn2 are respectively impedances to ground the neutral points of the primary windings 301 and secondary windings 302. As a modified example, of course the three-phase circuit breaker 200 may be replaced with single-phase circuit breakers for each of the three phases, with the three single-phase circuit breakers simultaneously closed or opened.

400 is a power supply voltage measuring device, comprising a VT or similar, to measure the voltages of each phase (U, V, W) of the power supply busbar 100; 500 is a transformer terminal voltage measuring device, comprising a VT or similar, to measure the terminal voltages of each primary-side phase (U, V, W) of the three-phase transformer 300; and 600 is a closing control device, comprising a magnetizing inrush current suppression device, which outputs a closing command to the main points of the circuit breaker 200.

In the closing control device 600, 601 is power supply voltage measurement means for capturing and measuring the power supply voltages of each phase (phases U, V, W) output from the VT or other power supply voltage measuring device 400, and 602 is steady-state magnetic flux calculation means for calculating the steady-state magnetic flux for each phase, by integrating each of the phase voltages measured by the power supply voltage measurement means 601.

On the other hand, 603 is transformer terminal voltage measurement means for capturing and measuring the transformer terminal voltages for each phase (phases U, V, W) output from the transformer terminal voltage measuring device 500, and 604 is residual magnetic flux calculation means for calculating, for each phase, the transformer core residual magnetic flux, by integrating each of the phase voltages measured by the transformer terminal voltage measurement means 603.

605 is phase detection means for taking input, for each phase (phases U, V, W) of the output signals of the steady-state magnetic flux calculation means 602 and the output signals of the residual magnetic flux calculation means 604, and for detecting phases at which the steady-state magnetic flux and the transformer core residual magnetic flux have the same polarity. 606 is closing command output means for taking input, for three phases, of the output signals of the phase detection means 605, and for outputting a closing command to the operation mechanism driving the main points of the circuit breaker 200 such that the main points of the circuit breaker 200 are electrically closed in the region in which the logical product for the three phases obtains.

(Action)

In FIGS. 2, 1 to 3 are power supply voltages for each phase (phases U, V, W) measured by the power supply voltage measurement means 601. 4 to 6 are the transformer core steady-state magnetic flux for each phase (phases U, V, W), calculated by integration, by the steady-state magnetic flux calculation means 602, of voltages measured by the power supply voltage measurement means 601 when the three-phase voltages are applied in the steady state to the transformer. And, 7 to 9 are transformer core residual magnetic fluxes for each phase (phases U, V, W) obtained by integration of voltages measured by the transformer terminal voltage measurement means 603 and calculation by the residual magnetic flux calculation means 604.

In the example of the figure, a state is shown in which the transformer U phase core residual magnetic flux 7 has the largest residual magnetic flux and has positive polarity, and the V phase core residual magnetic flux 8 and W phase core residual magnetic flux 9 have negative polarity and with different values.

As is clear from FIG. 2, for the U phase the polarities of the core residual magnetic flux 7 and of the steady-state magnetic flux 4 coincide in the phase region denoted by 10. Similarly, for the V phase the polarities of the core residual magnetic flux 8 and of the steady-state magnetic flux 5 coincide in the phase region denoted by 11, and for the W phase the polarities of the core residual magnetic flux 9 and of the steady-state magnetic flux 6 coincide in the phase region denoted by 12. These phase regions 10, 11 and 12 in which the polarities of the residual magnetic flux and the steady-state magnetic flux coincide are each detected by the phase detection means 605. And, of these phase regions 10 to 12, the phase region in which the polarities of the steady-state magnetic flux and the residual magnetic flux coincide for all three phases is the region denoted by 13, and is determined by the taking the AND condition of the phase regions 10, 11 and 12, that is, by taking the logical product of the signals output from the phase detection means 605 for each of the phases. This phase region 13 is the closing target phase region for the three-phase circuit breaker 200.

(Advantageous Effects)

FIG. 3 is a waveform diagram showing the residual magnetic flux, closing phase, and magnetic flux after supplying power when a single-phase circuit breaker is used to supply power to a single-phase transformer. 15 denotes the steady-state magnetic flux when the power supply voltage 14 is applied to the transformer in the steady state. As explained above, the magnetic flux is obtained by integrating the voltage, so that the phase lags the voltage phase by 90°.

When the transformer residual magnetic flux is 0, and the circuit breaker is closed at a phase of −180° in FIG. 3, the transformer magnetic flux is denoted by 16. At this time the magnetic flux 16 is greatest at phase 0°, with a value of 2 p.u. That is, this closing phase is the condition for the maximum magnetizing inrush current flowing when the transformer residual magnetic flux is 0.

When there is a transformer residual magnetic flux 17, if the circuit breaker is closed at a phase of −180°, the magnetic flux becomes as indicated by 18, and the maximum value becomes 2 p.u.+the magnitude of the residual magnetic flux 17. The maximum value of the difference between the magnetic flux 18 and the magnetic flux 16 is equal to the residual magnetic flux 17; but the current-magnetic flux characteristic of the transformer core is a saturation characteristic, and under the conditions of the magnetic flux 18, compared with conditions of the magnetic flux 16 in which the residual magnetic flux is 0 and closing is performed at a phase of −180°, the magnitude of the magnetizing inrush current is greatly increased, by an amount equal to or greater than that corresponding to the residual magnetic flux 17.

On the other hand, 19 is the magnetic flux resulting when the residual magnetic flux is as indicated by 17, and closing is performed at a phase of −90°. The maximum value of the magnetic flux in this case is 1 p.u.+the magnitude of the residual magnetic flux 17. That is, if the circuit breaker 200 is closed in the phase region −90° to 90°, in which the polarities of the residual magnetic flux 17 and the steady-state magnetic flux 15 are the same, then the maximum value of the magnetic flux after closing is smaller than at least 2 p.u., and is never larger than the magnetic flux indicated by 16. Hence if the circuit breaker 200 is closed in the phase region in which the residual magnetic flux 17 and the steady-state magnetic flux 15 have the same polarity, even when there is a residual magnetic flux 17, the magnitude of the magnetizing inrush current can be made smaller than the maximum magnetizing inrush current flowing when the circuit breaker 200 is closed at a residual magnetic flux of 0.

In a three-phase transformer used in an electric power system, generally the secondary or the tertiary windings are Δ-connected; in the example of FIG. 1, the tertiary windings are Δ-connected. The sum of the residual magnetic flux for each of the phases after the three-phase transformer 300 has been shut off using the circuit breaker 200 is always 0 due to Δ connection of the secondary or tertiary windings. Hence when the residual magnetic flux for one phase in a three-phase transformer is for example the largest and at positive polarity, the residual magnetic flux for the other two phases are either both negative polarity, or else one phase is negative polarity and at maximum, while the other phase is at 0.

FIG. 2 shows a case of the above residual magnetic flux relation for a three-phase transformer, that is, a case in which the sum total of the residual magnetic flux for the three phases is 0, the residual magnetic flux for the U phase is positive and at maximum, and the residual magnetic flux values for the other two phases have negative polarity.

In the U phase, the residual magnetic flux 7 and the steady-state magnetic flux 4 are the same polarity in the region 10. Hence if the circuit breaker 200 is closed in the phase region 10, the magnetizing inrush current at least for the U phase can be made smaller than the maximum magnetizing inrush current for a residual magnetic flux of 0.

The steady-state magnetic fluxes 4, 5, 6 for the three-phase transformer 300 are phase-shifted by 120° from each other. Hence if the circuit breaker is closed for all three phases simultaneously in the phase region 10 at which the residual magnetic flux 7 and the steady-state magnetic flux 4 of the U phase are the same polarity, the magnetizing inrush currents for the other V and W phases are not necessarily made smaller.

However, as explained above, due to the relation between the residual magnetic fluxes of the three phases, the residual magnetic fluxes for the V and W phases are negative, as shown in FIG. 2. At this time, the residual magnetic flux 8 and steady-state magnetic flux 5 for the V phase have the same polarity in the phase region 11. Similarly for the W phase, the residual magnetic flux 9 and steady-state magnetic flux 6 have the same polarity in the phase region 12.

Here, in the phase region 13, the phase region 10 in which the residual magnetic flux 7 and steady-state magnetic flux 4 for the U phase have the same polarity, the phase region 11 in which the residual magnetic flux 8 and steady-state magnetic flux 5 for the V phase have the same polarity, and the phase region 12 in which the residual magnetic flux 9 and steady-state magnetic flux for the W phase have the same polarity, overlap. Hence if the circuit breaker is closed for all three phases simultaneously in the phase region 13, the magnetizing inrush current can be suppressed for all three phases.

FIG. 4 assumes conditions such that the residual magnetic flux for one phase is 0, and that for the other two phases are maximum with positive and with negative polarity. The phase with a value for the residual magnetic flux 9 of 0 is the W phase. Because the value of the residual magnetic flux 9 of the W phase is 0, the phase at which the steady-state magnetic flux 6 and the residual magnetic flux 9 have the same polarities may be −180° to 0°, or may be 0° to 180°.

In this case also, the phase region in which the residual magnetic flux and the steady-state magnetic flux are the same polarity for all three phases is 20 or 21. Hence if all three phases of the circuit breaker 200 are closed simultaneously in the phase region 20 or 21, the magnetizing inrush current can be suppressed for all three phases.

As explained above, because in a three-phase transformer used in an electric power system the secondary or tertiary windings are Δ-connected, due to the Δ connection, the sum total of the residual magnetic flux for the phases after shutting off a three-phase transformer 300 using a circuit breaker 200 is always 0. This is not affected by the method of grounding of the neutral point of the primary-side Y connection. Hence in both a three-phase transformer installed in an effectively grounded system, and in a three-phase transformer installed in a non-effectively grounded system, the closing phase region 13 can be set, and so of course when energizing a transformer 300 using a non-phase segregated operation-type circuit breaker 200, or when energizing by simultaneous operation of each of the three phases using single-phase circuit breakers, the above described closing phase control method can be used to suppress magnetizing inrush currents.

When closing the circuit breaker 200, there exists variation in the closing times arising from advance discharge called pre-arcing which occurs across the main points, as well as from variation in operation of the closing mechanism. The variation in closing due to pre-arcing, and the variation in the circuit breaker closing times, can be corrected by determining the characteristics in advance and using a control device to execute phase control, and so even with such variation, the closing of a circuit breaker 200 can of course be kept within the closing target phase region 13 in FIG. 2 or the closing target phase regions 20, 21 in FIG. 4.

(Embodiment 2)

Figure 5:
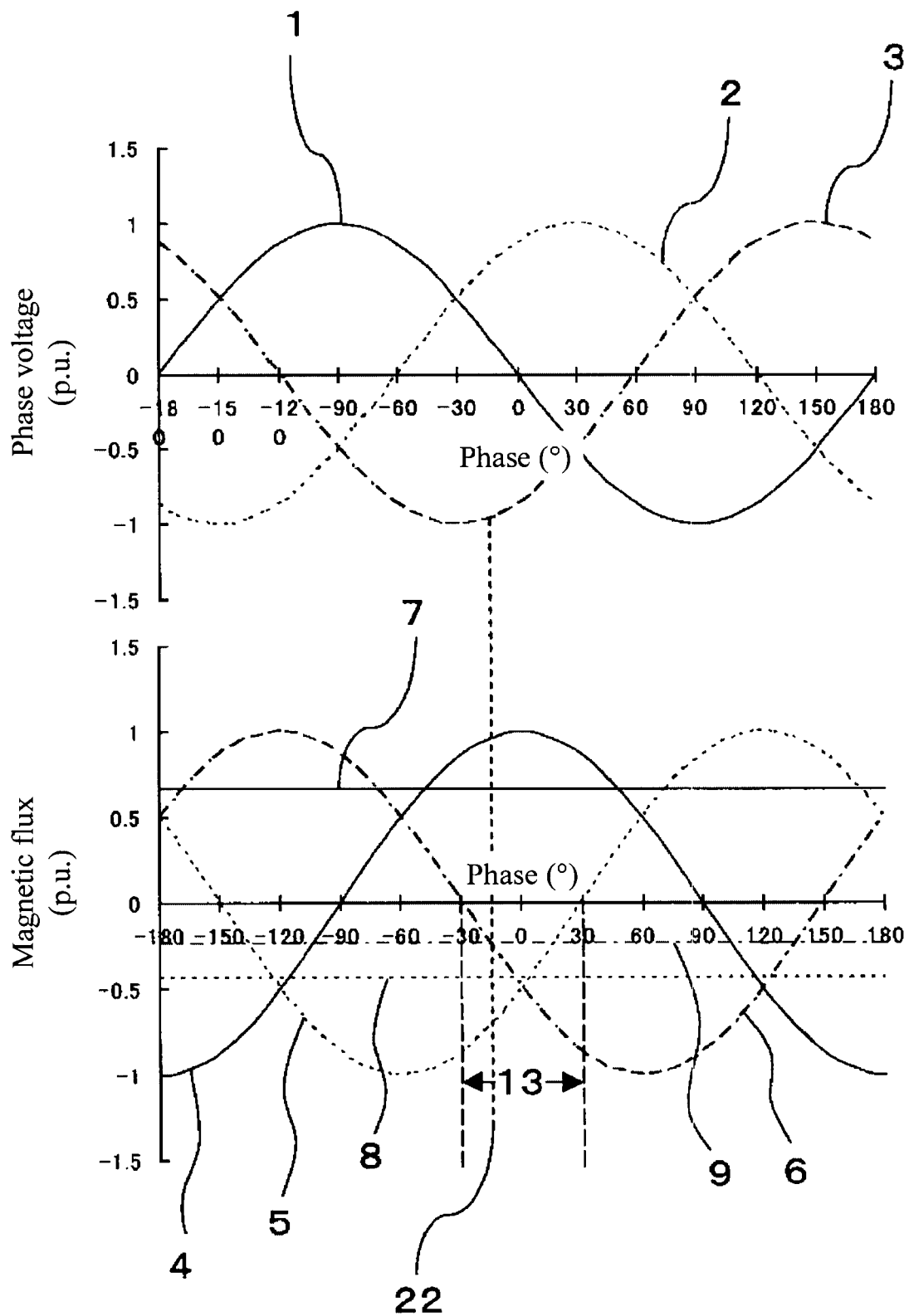
FIG. 5 is a waveform diagram showing the relation phase voltages at the time of supplying power to three-phase transformer, steady-state magnetic flux, and residual magnetic flux, in Embodiment 2 of the invention.
Figure 6:
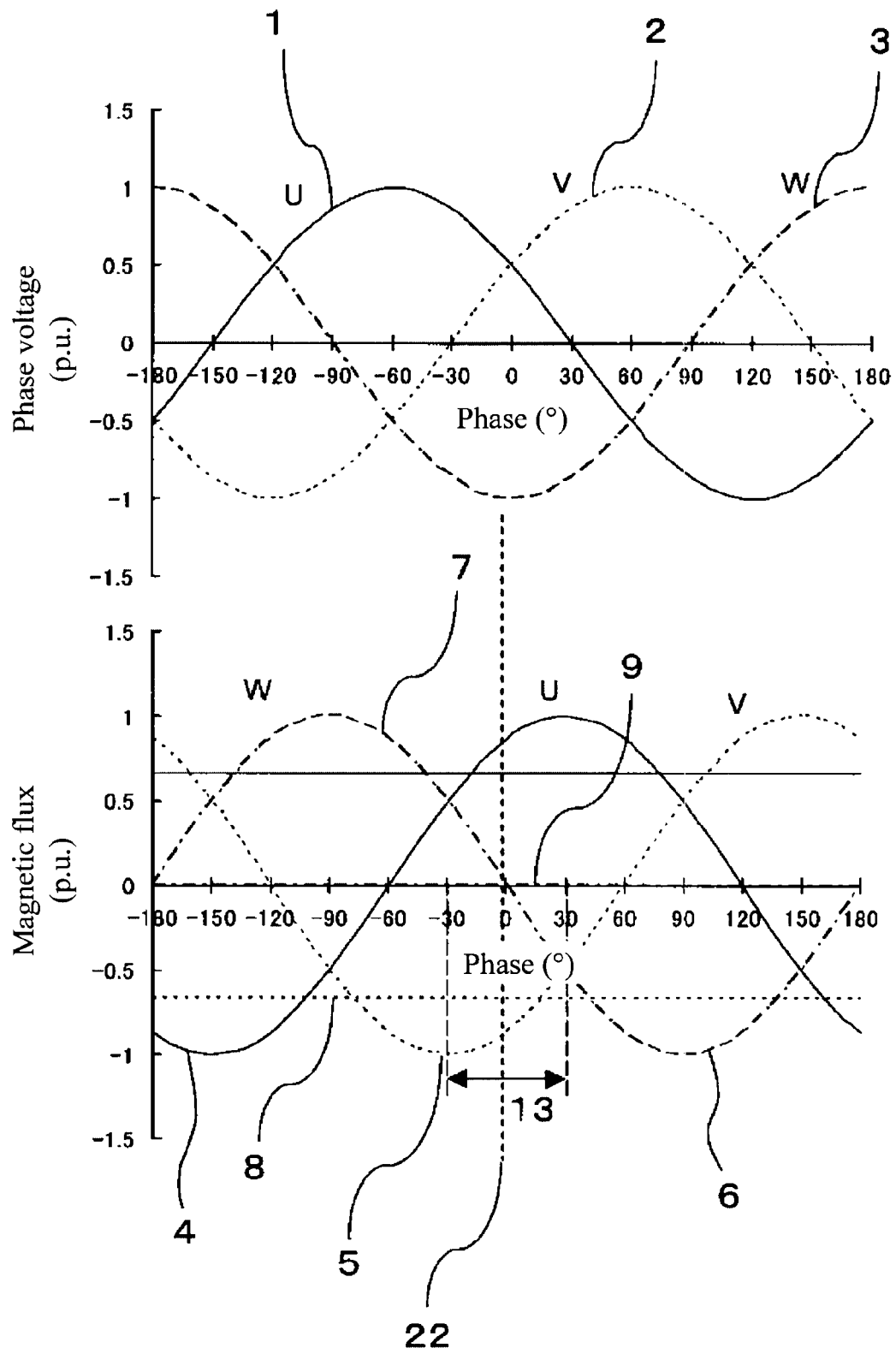
FIG. 6 is a waveform diagram showing the relation phase voltages at the time of supplying power to three-phase transformer, steady-state magnetic flux, and residual magnetic flux, in Embodiment 2 of the invention.
Figure 7:
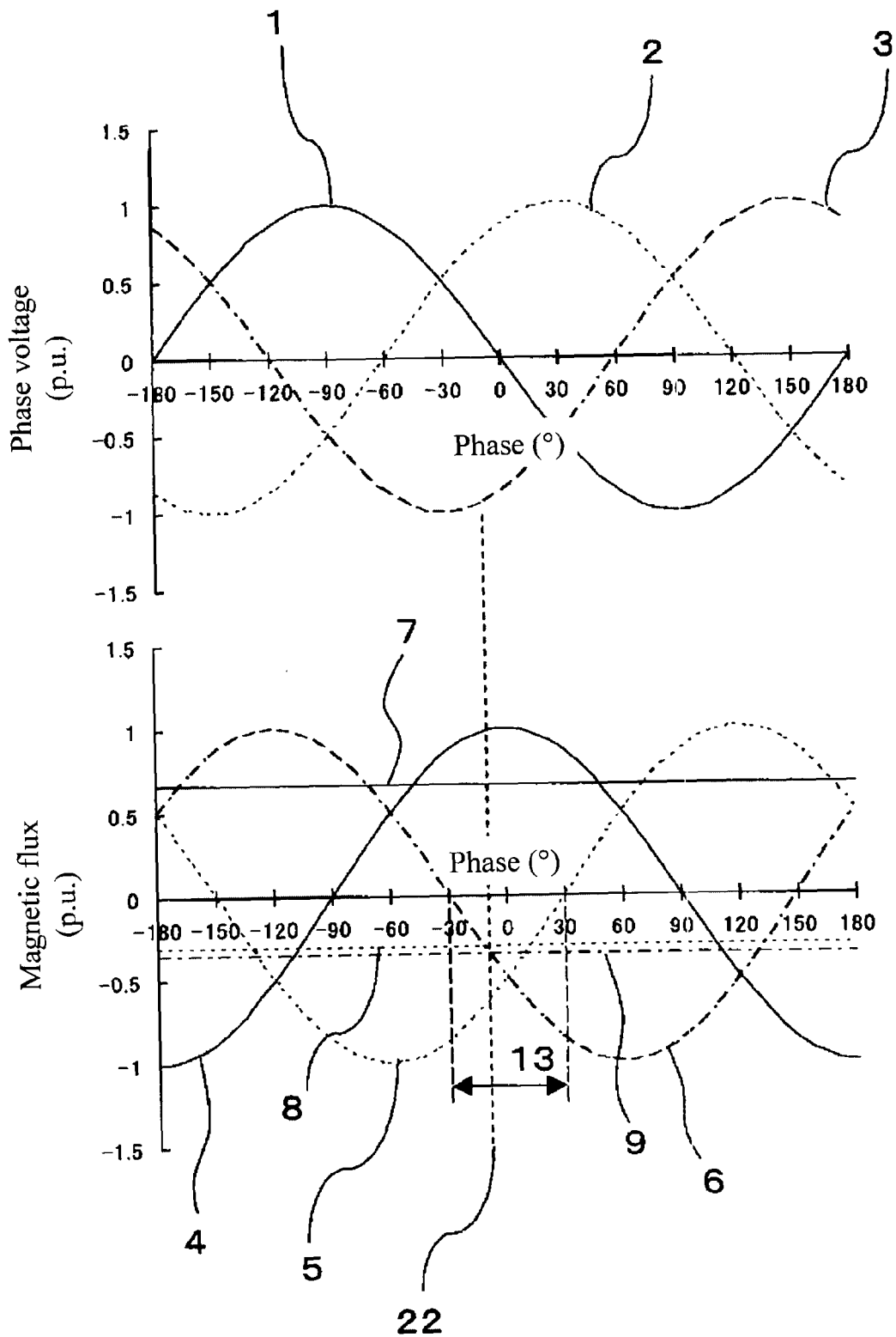
FIG. 7 is a waveform diagram showing the relation phase voltages at the time of supplying power to three-phase transformer, steady-state magnetic flux, and residual magnetic flux, in Embodiment 2 of the invention.

FIG. 5 to FIG. 7 are provided to explain Embodiment 2; FIG. 5 to FIG. 7 are waveform diagrams showing the relations between the phase voltages, steady-state magnetic flux and residual magnetic flux when energizing a three-phase transformer, and each assume cases in which the manner in which the residual magnetic flux remains is different. In Embodiment 2, the connection relation between the three-phase transformer, three-phase circuit breaker, and magnetizing inrush current suppression device is the same as the case of the above-described Embodiment 1, and so a block diagram corresponding to that of FIG. 1 is omitted.

(Configuration)

In Embodiment 2, the closing control device 600 is set such that the closing target point of the three-phase circuit breaker 200 is the point of intersection 22 of the steady-state magnetic flux and the residual magnetic flux for the phase with the smallest residual magnetic flux among the phases of the three-phase transformer 300.

(Action)

In FIG. 5, with the condition that the sum of the residual magnetic fluxes for the phases of the three-phase transformer is 0, the residual magnetic flux 7 for the U phase is maximum and of positive polarity, and the residual magnetic fluxes 8, 9 for the V and W phases are both negative and of different values, and the relation residual magnetic flux 8>residual magnetic flux 9 obtains, so that the W phase is the phase for which the residual magnetic flux is smallest. Hence in the case of FIG. 5, the point of intersection 22 of the steady-state magnetic flux 6 and the residual magnetic flux 9 for the W phase is taken to be the circuit breaker closing target point, and the closing target point is set for the three-phase circuit breaker 200.

FIG. 6 shows a case in which the U and V phase residual magnetic flux values are respectively of positive and negative polarity and are both maximum, and that for the W phase is 0. In this case also, the W phase is the phase with the smallest residual magnetic flux, and the point of intersection 22 of the steady-state magnetic flux 6 and the residual magnetic flux 9 for the W phase is taken to be the breaker closing target point, and the closing target point for the three-phase circuit breaker 200 is set.

FIG. 7 shows a case which assumes that the residual magnetic flux 8 and 9 of the V and W phases is ½ the residual magnetic flux 7 of the U phase. In FIG. 7, in order to distinguish and clearly show the residual magnetic flux 8 of the V phase and the residual magnetic flux 9 of the W phase, the two residual magnetic flux lines are intentionally drawn so as not to overlap. In the case of FIG. 7 also, the point of intersection 22 of the steady-state magnetic flux 6 and the residual magnetic flux 9 for the W phase is taken as the circuit breaker closing target point, and the closing target point for the three-phase circuit breaker 200 is set.

As is clear from FIG. 5 to FIG. 7, the circuit breaker closing target point 22 is within the closing target phase region 13 (−30° to 30°) shown in FIG. 2, and for all three phases, the difference between the residual magnetic flux and the steady-state magnetic flux for each phase is reduced.

(Advantageous Effects)

By means of Embodiment 2, the difference between the steady-state magnetic flux and the residual magnetic flux for each phase can be reduced, and by causing the three-phase circuit breaker 200 to close at the closing target point 22 to magnetize the transformer 300, large magnetizing inrush currents can be suppressed.

(Embodiment 3)

Figure 8:
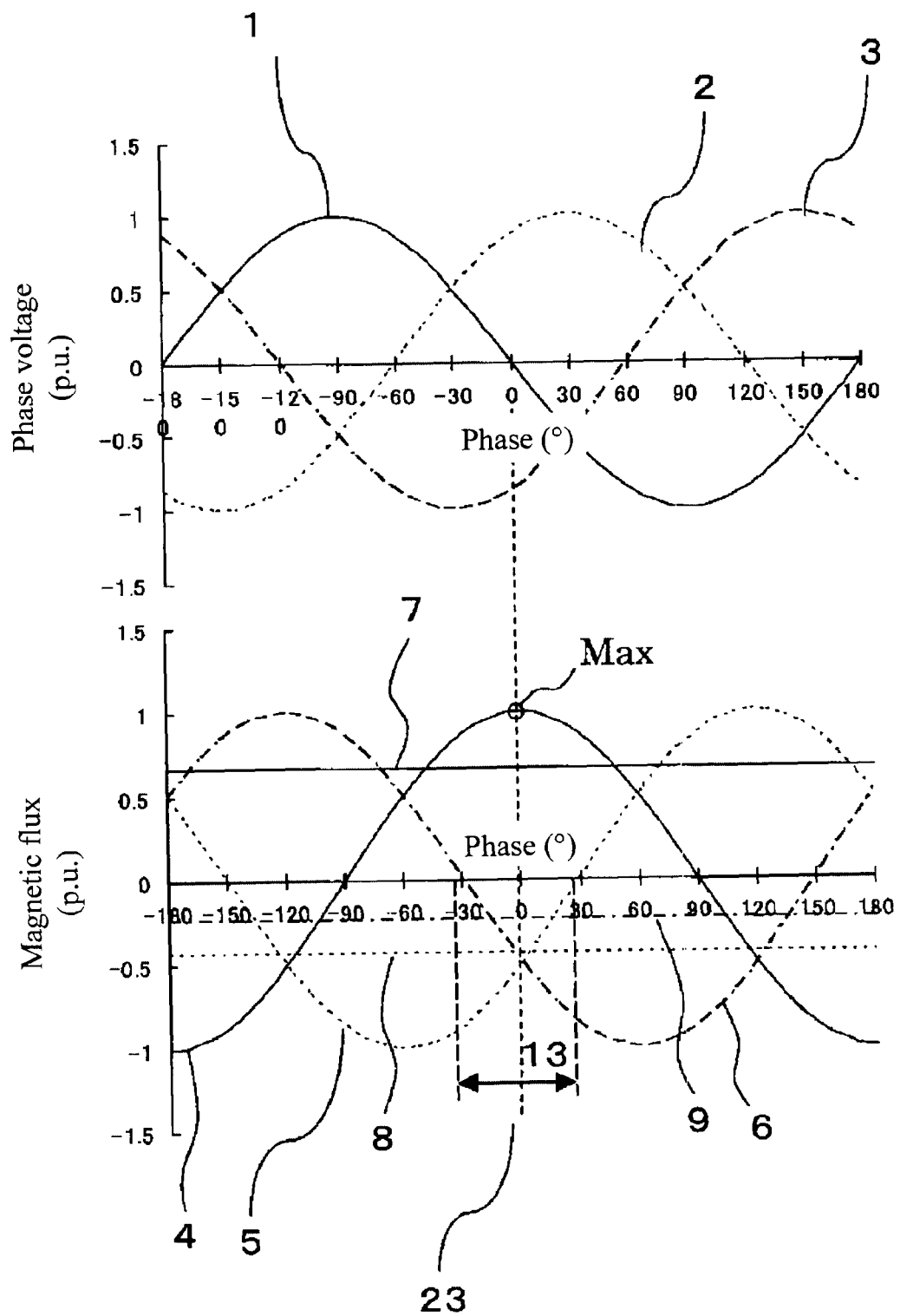
FIG. 8 is a waveform diagram showing the relation phase voltages at the time of supplying power to three-phase transformer, steady-state magnetic flux, and residual magnetic flux, in Embodiment 3 of the invention.
Figure 9:
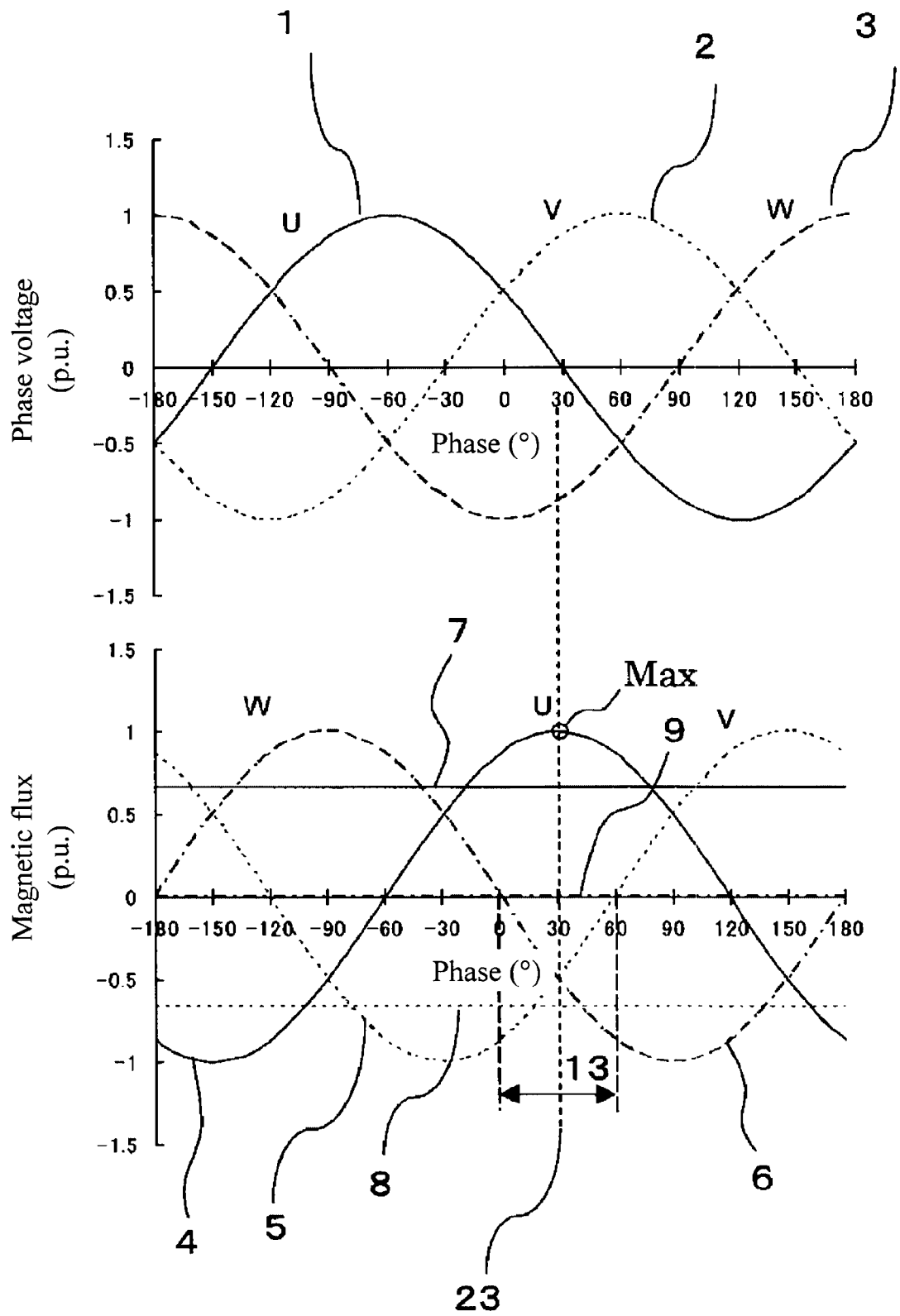
FIG. 9 is a waveform diagram showing the relation phase voltages at the time of supplying power to three-phase transformer, steady-state magnetic flux, and residual magnetic flux, in Embodiment 3 of the invention.
Figure 10:
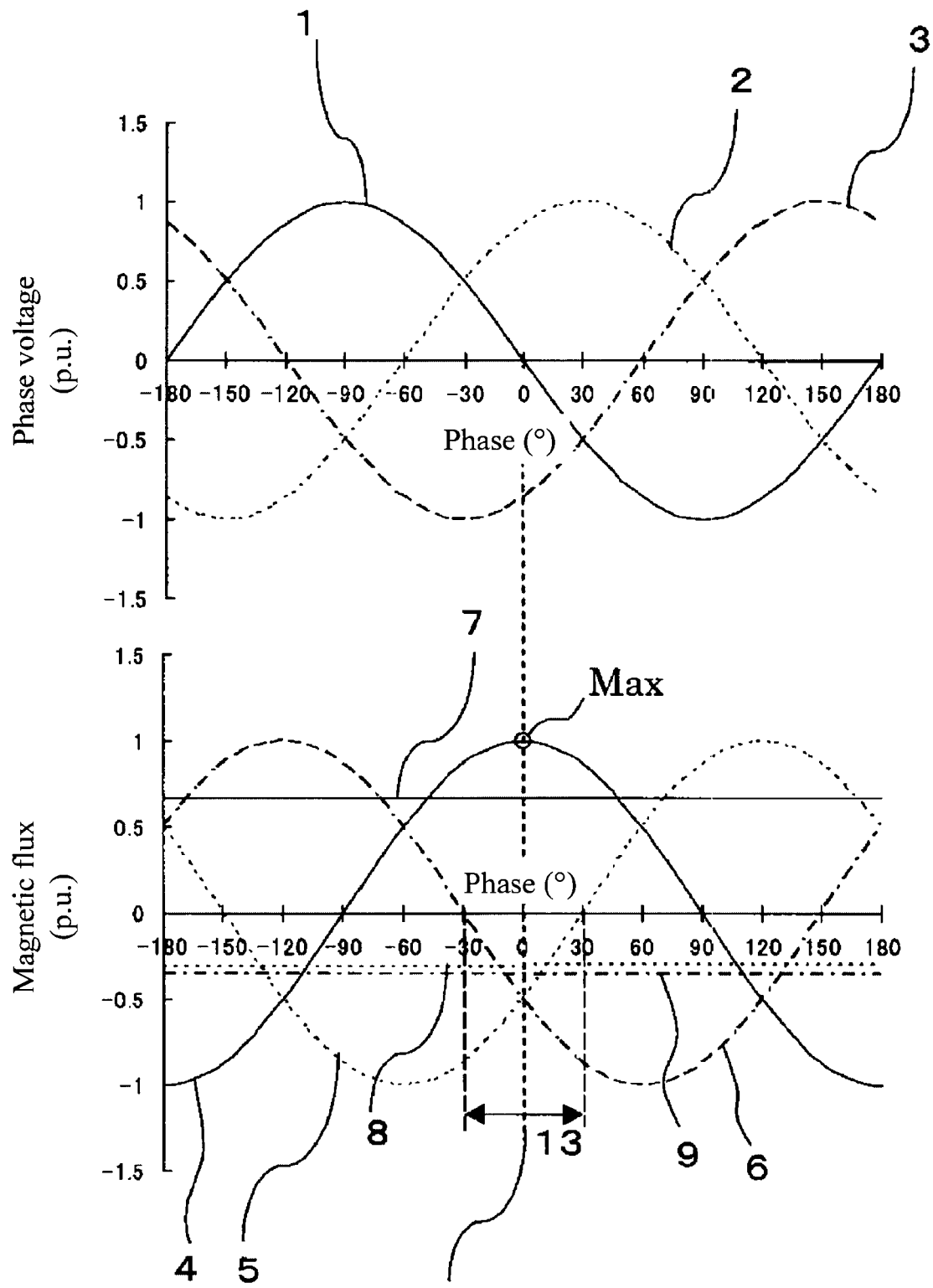
FIG. 10 is a waveform diagram showing the relation phase voltages at the time of supplying power to three-phase transformer, steady-state magnetic flux, and residual magnetic flux, in Embodiment 3 of the invention.

FIG. 8 to FIG. 10 explain Embodiment 3. In particular, FIG. 8 to FIG. 10 are waveform diagrams showing the relation between the phase voltage, steady-state magnetic flux, and residual magnetic flux at the time of energizing of a three-phase transformer; each assume cases in which the manner in which the residual magnetic flux remains is different. In Embodiment 3, the connection relation between the three-phase transformer, three-phase circuit breaker, and magnetizing inrush current suppression device is the same as the case of the above-described Embodiments 1 and 2, and so a block diagram corresponding to that of FIG. 1 is omitted.

(Configuration)

In Embodiment 3, the closing control device 600 is set such that the closing target point of the three-phase circuit breaker 200 is made the time at which the steady-state magnetic flux is at peak value in the phase with the largest residual magnetic flux at the time of energizing of the three-phase transformer, that is, at the 0 point of the phase voltage leading the steady-state magnetic flux by 90°. The conditions of the magnetic flux in FIG. 8 to FIG. 10 are the same as in FIG. 5 to FIG. 7.

(Action)

In FIG. 8, given the condition that the sum of the residual magnetic flux for the phases of the three-phase transformer is 0, because the residual magnetic flux 7 for the U phase is maximum and of positive polarity, and the residual magnetic flux values 8 and 9 for the V and W phases are both of negative polarity and have different values, with the relation residual magnetic flux 7>residual magnetic flux 8>residual magnetic flux 9 obtaining, the U phase is the phase for which the residual magnetic flux is largest. Hence in the case of FIG. 8, the peak value of the steady-state magnetic flux 4 of the U phase is taken to be the circuit breaker closing target point 23, and the closing target point for the three-phase circuit breaker 200 is set.

In the case of FIG. 9, the U and V phase residual magnetic flux values are respectively of positive and negative polarity and are maximum, and the magnetic flux for the W phase is 0. In this case also, the U phase is the phase with the largest residual magnetic flux value, and the peak value of the residual magnetic flux 4 for the U phase is taken to be the circuit breaker closing target point 23 to set the closing target point for the three-phase circuit breaker 200.

FIG. 10 shows a case in which the V and W phase residual magnetic fluxes 8 and 9 are assumed to be ½ the residual magnetic flux 7 of the U phase. In FIG. 10, in order to make the residual magnetic flux 8 of the V phase and the residual magnetic flux 9 of the W phase easier to view, the two residual magnetic flux lines are intentionally drawn so as not to overlap. In this case in FIG. 10 also, the peak value of the residual magnetic flux 4 for the U phase is taken to be the circuit breaker closing target point 23, and the closing target point for the three-phase circuit breaker 200 is set.

As is clear from FIG. 8 to FIG. 10, the circuit breaker closing target point 23 is within the closing target phase region 13 shown in FIG. 2, and the difference between the residual magnetic flux and the steady-state magnetic flux is small for each of the three phases.

(Advantageous Effects)

By means of Embodiment 3, the difference between the steady-state magnetic flux and the residual magnetic flux for each phase can be made small, and if the three-phase circuit breaker 200 is closed at the closing target point 23 to magnetize the transformer 300, large magnetizing inrush currents can be suppressed.

(Modified Example)

In the above-described Embodiments 1 to 3, cases were explained in which the primary side of the transformer 300 is Y-connected; but if the phase voltages shown in FIG. 2 and FIG. 4 to FIG. 10 are taken to be line-to-line voltages, and the result of integration of these line-to-line voltages is taken to be the magnetic flux, then the conditions for energizing the transformer 300 when the primary side is Δ-connected are obtained. In this case also, a similar closing phase control method can of course be used to suppress large magnetizing inrush currents.

(Embodiment 4)

Figure 11:
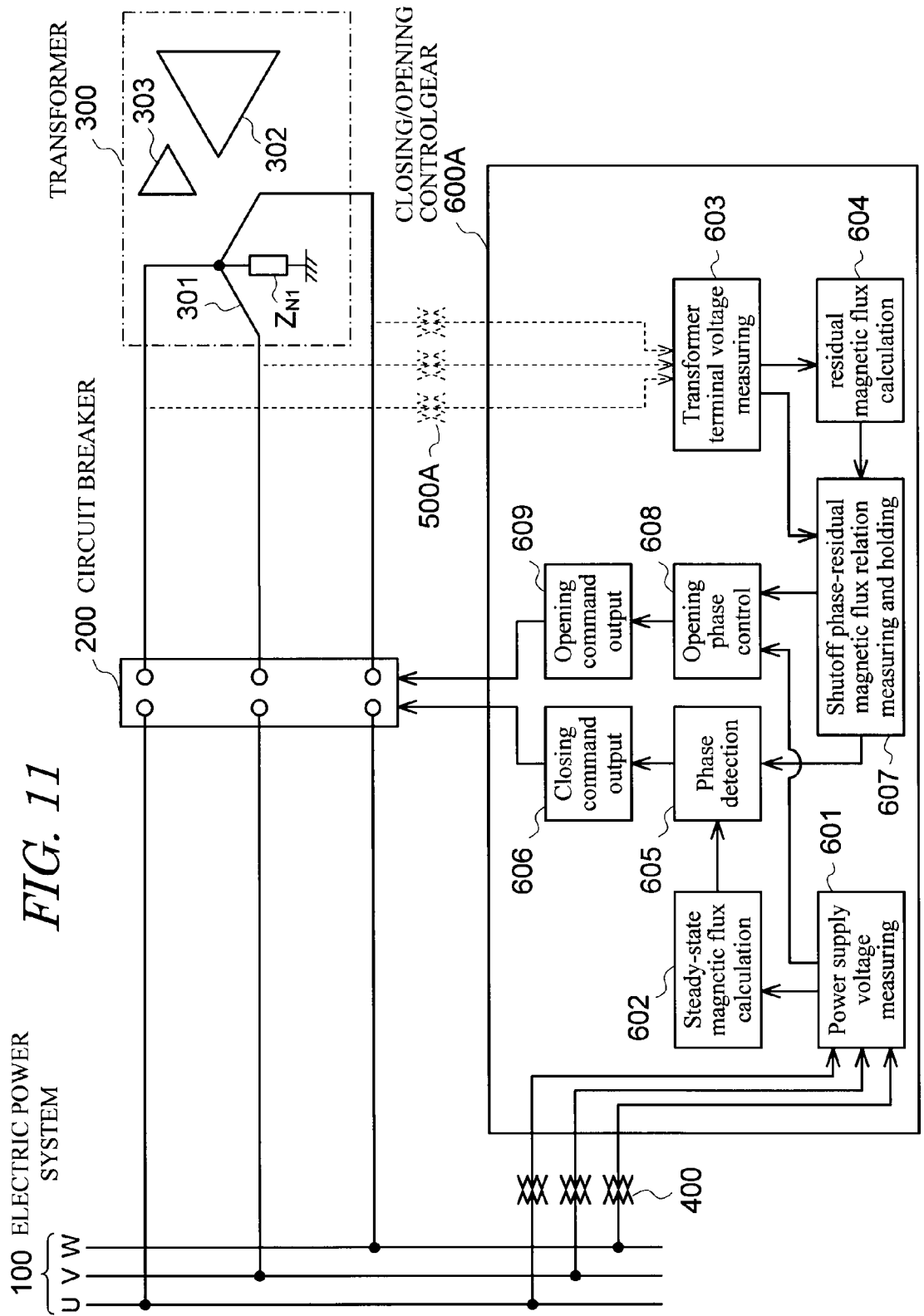
FIG. 11 is a block diagram showing the connection relation between a three-phase transformer, a three-phase circuit breaker, and a magnetizing inrush current suppression device in Embodiment 4 of the invention.
Figure 12:
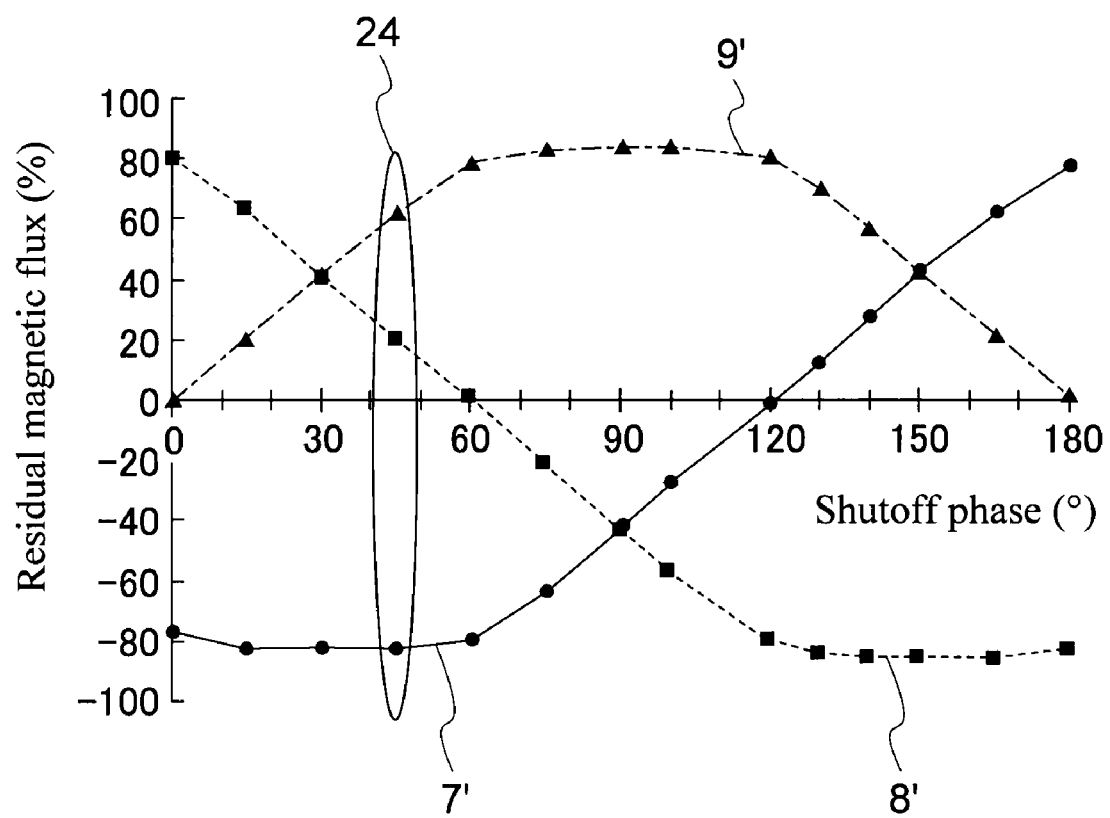
FIG. 12 shows an example of calculated results for the shutoff phase and residual magnetic flux for each phase, when three single-phase transformers are connected with Y and Δ connections, and are shut off by a circuit breaker in Embodiment 4 of the invention.

FIG. 11 and FIG. 12 explain Embodiment 4; in particular, FIG. 11 is a block diagram showing the connection relation of the three-phase transformer, three-phase circuit breaker, and magnetizing inrush current suppression device, and FIG. 12 shows an example of residual magnetic flux when three single-phase transformers are Y- and Δ-connected, and the three phases of the transformers are shut off with circuit breakers, calculated with the shutoff phase varied.

(Configuration)

In FIG. 11, the power system configuration is the same as in FIG. 1, but differences with FIG. 1 are that the secondary windings 302 of the transformer 300 are Δ-connected, and moreover, when a transformer terminal voltage measuring device 500 is not connected to any among the primary terminals, secondary terminals, or tertiary terminals in the normal operating state of the transformer 300, a transformer terminal voltage measuring device for temporary connection 500A is connected to the primary-side terminals, and the output voltage is input to the transformer terminal voltage measurement means 603 of the closing/opening control device 600A.

This closing/opening control device 600A is provided in place of the closing control device 600 of Embodiment 1, and comprises a magnetizing inrush current suppression device; the constituent components from the power supply voltage measurement means 601 to the closing command output means 606 are common with the closing control device 600 of Embodiment 1, whereas the shutoff phase/residual magnetic flux relation measuring and holding means 607, opening phase control means 608, and opening command output means 609, have been added.

The shutoff phase/residual magnetic flux relation measuring and holding means 607 comprises functions to shut off the circuit breaker in a state of temporary connection to the transformer terminal voltage measuring device 500A at least once (in general, a plurality of times), take as inputs the voltage shutoff phase output from the transformer terminal voltage measurement means 603 and the magnetic flux signal output from the residual magnetic flux calculation means 604 at this time, and measure the relation between the shutoff phase and the residual magnetic flux.

The opening phase control means 608 comprises functions to take as inputs the output of the power supply voltage measurement means 601 and the shutoff phase/residual magnetic flux relation measuring and holding means 607, and to control the main point opening phase. And, the opening command output means 609 comprises functions to receive output signals from the opening phase control means 608, and to output opening commands to an operation mechanism which drives the main points of the circuit breaker 200.

FIG. 12 shows, as an example, the residual magnetic flux, obtained by calculations with the shutoff phase varied, resulting by shutting off the three phases of the transformer 300 with the circuit breaker 200, when three single-phase transformers, 3.3 kV-415 V-300 kVA, are Y- and Δ-connected.

As explained above, in the normal state of operation of the three-phase transformer 300, when a transformer terminal voltage measuring device 500 is not installed at any of the primary-side, secondary-side, or tertiary-side terminals, with the transformer terminal voltage measuring device 500A temporarily connected the circuit breaker 200 is shut off at least once (generally a plurality of times), and the residual magnetic flux characteristics for each transformer phase versus the circuit breaker shutoff phase, equivalent to those of FIG. 12, are measured in advance. In the figure, 24 denotes the residual magnetic flux for each phase when the shutoff phase is set such that the residual magnetic flux for one phase is maximum, and 7', 8', 9' denote the residual magnetic fluxes for the U phase, V phase, and W phase respectively.

The transformer terminal voltage measuring device 500A is temporarily connected in order to measure the characteristics of these residual magnetic fluxes 7', 8', 9', and is removed in the normal operating state. Of course, the transformer terminal voltage measuring device 500A may be installed permanently. It is sufficient to obtain the relation between shutoff phase and residual magnetic flux, and so there is no need to measure in detail the residual magnetic flux characteristics as shown in FIG. 12.

When the circuit breaker 200 is used to shut off the transformer 300 in normal operation, the opening command output means 609 controls the opening phase of the circuit breaker such that the shutoff phase is always the same to perform shutoff. By this means, it is possible to estimate that the residual magnetic flux for each phase is for example that indicated by 24 among the residual magnetic flux characteristics equivalent to those measured in advance in FIG. 12.
(Action)

Once the circuit breaker 200 and transformer 300 are installed in the power system, the circuit conditions for the power system (in the case of FIG. 11, the circuit conditions from the power system 100 to the transformer 300) are always the same, and so if the phase at which the circuit breaker 200 is shut off is always the same, then the values of the residual magnetic flux of the transformer 300 for each phase should also always be the same.

Hence even in cases in which a voltage measuring device is not always connected to any of the primary to tertiary terminals of the transformer 300, information on the residual magnetic flux of the transformer 300 after shutoff by the circuit breaker 200 at a prescribed phase can always be obtained.

However, in transformer substations, busbar voltage measurement equipment and other power supply voltage measuring device is always installed for busbars and similar. If the voltage information of such power supply voltage measuring device is available, then the transformer steady-state magnetic flux can be calculated even when transformer terminal voltage measuring devices are not installed. Hence even when transformer terminal voltage measuring devices are not present, phase-controlled closing of the circuit breaker 200 is possible.
(Advantageous Effects)

Residual magnetic flux information after shutoff of the transformer by the circuit breaker is already known through measurements performed using a temporarily connected voltage measuring device, so that the relation between residual magnetic flux and steady-state magnetic flux can be obtained even when transformer terminal voltages are not measured at each shutoff; and by applying the phase detection methods of Embodiments 1 to 3 above, large magnetizing inrush currents can be suppressed at the time of input of the power supply to the transformer 300 by the circuit breaker 200.

Further, the transformer steady-state magnetic flux, that is, the magnetic flux when voltages are applied to the transformer in the steady state, can be determined by integrating the voltages measured by power supply voltage measuring devices installed on busbars or similar.
(Embodiment 5)

In the above-described Embodiment 4, in a method in which the shutoff phase is controlled and the residual magnetic flux is estimated, a transformer terminal voltage measuring device for temporary connection 500A is connected to the primary-side terminals of the transformer 300, and the output voltage is input to the transformer terminal voltage measurement means 603 of a closing/opening control device 600A; however, this invention is not limited to such a method, and can be applied to cases in which a voltage measuring device is connected to any among the primary, secondary, or tertiary terminals in the operating state of the transformer 300.

When a voltage measuring device is present on the side of the transformer 300 in this way, the reason for adopting this mode is that there is no need for input from a transformer-side voltage measuring device to a controller, so that there are the advantageous effects of a simplified controller and reduction of costs.

Further, the means for acquiring the relation between the circuit breaker shutoff phase and the transformer residual magnetic flux need not necessarily be incorporated into the synchronous closing/opening control device 600A of FIG. 11. Similar advantageous effects can be obtained even when the relation between the circuit breaker shutoff phase and the transformer residual magnetic flux is acquired using a separate unit, with the results along stored in the synchronous closing/opening control device 600A.

In actual operation, a more general mode is conceivable in which an already-installed VT, or a temporarily connected VT, is used, with a general-use measuring instrument employed to measure transformer voltages, and the relation between the circuit breaker shutoff phase and the transformer residual magnetic flux calculated from the measurement data using a microcomputer or similar.

(Embodiment 6)

Figure 13:
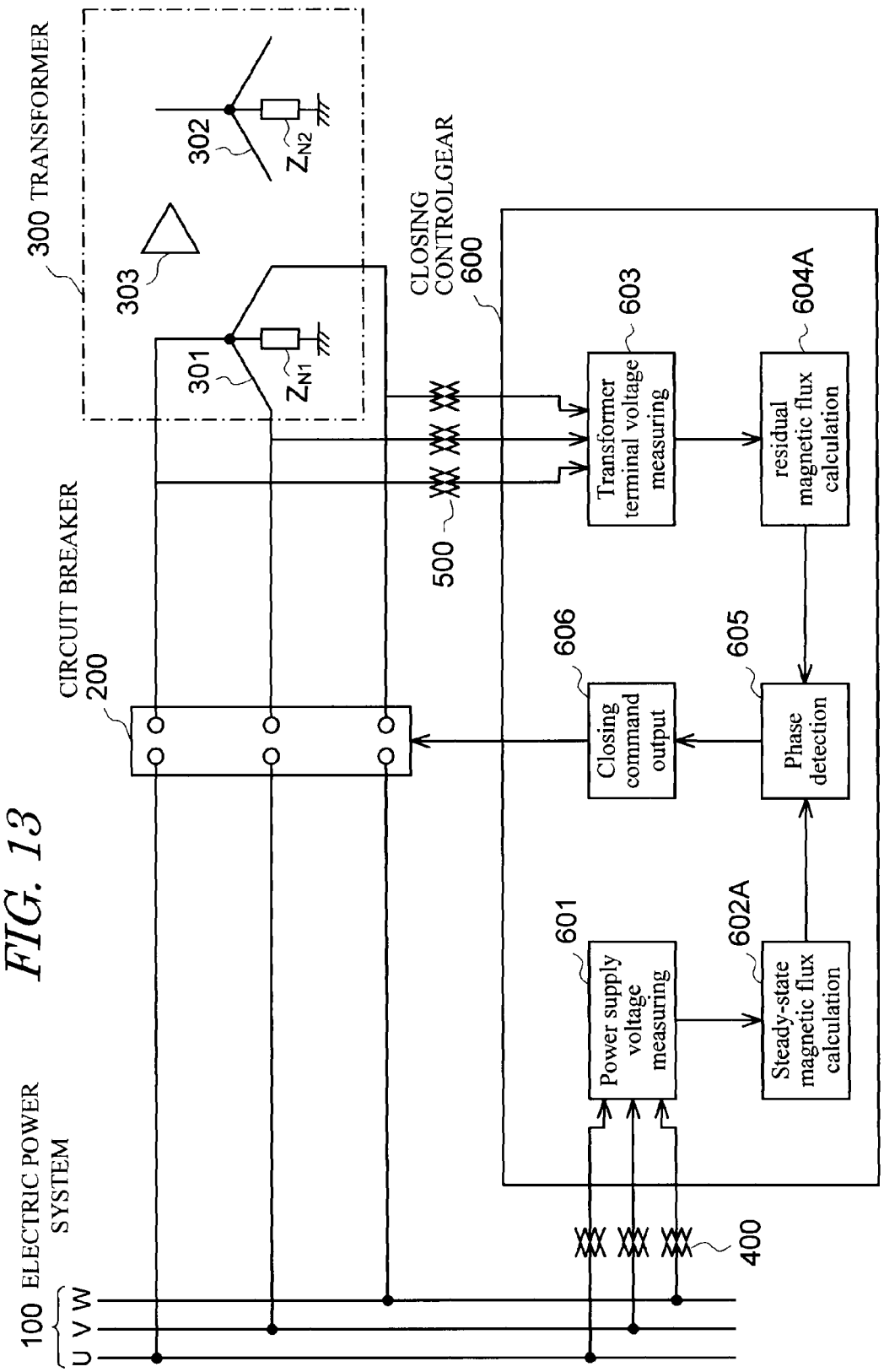
FIG. 13 is a block diagram showing the connection relation between a three-phase transformer, a three-phase circuit breaker, and a magnetizing inrush current suppression device in Embodiment 6 of the invention.
Figure 14:
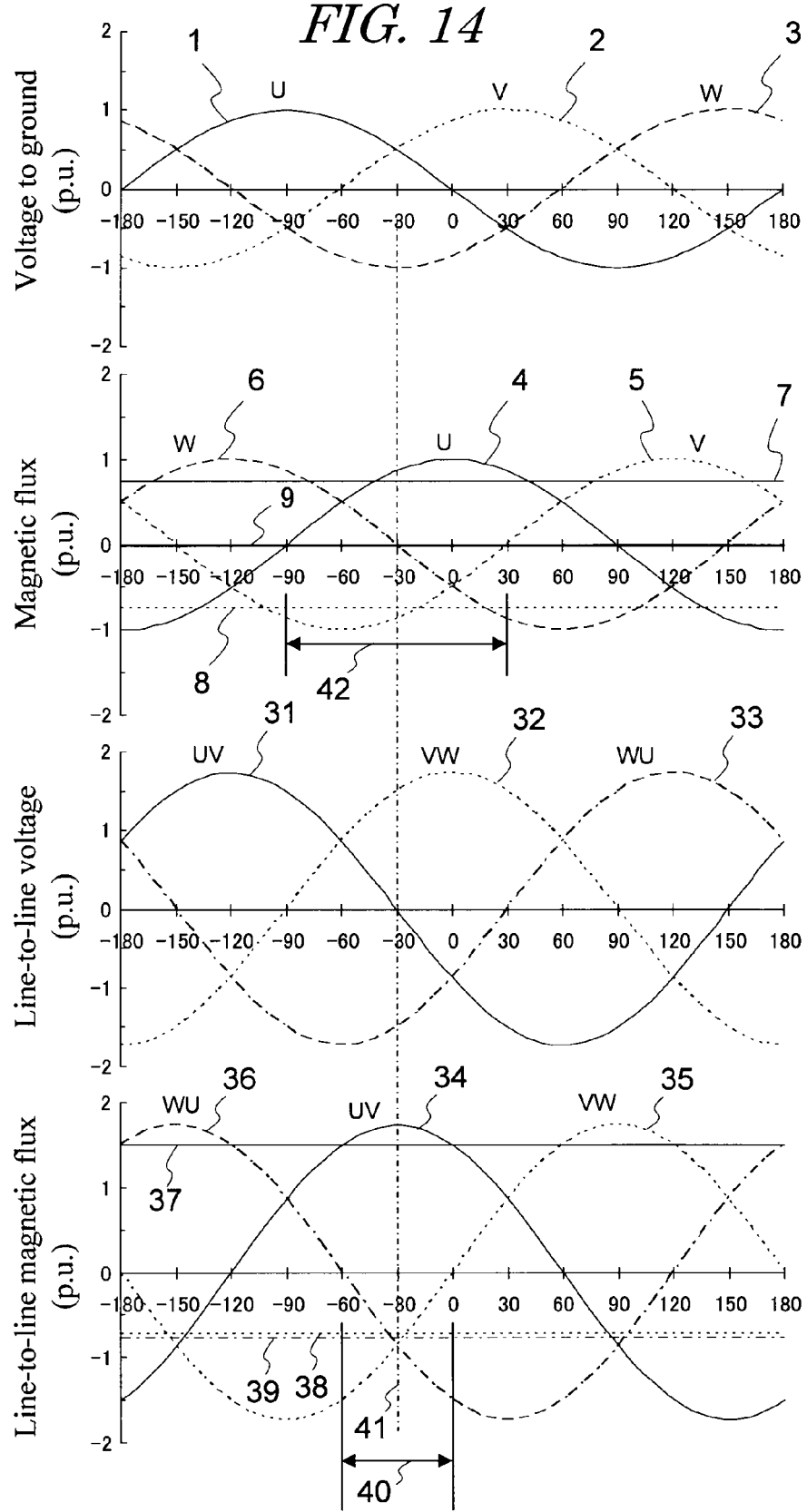
FIG. 14 is a waveform diagram showing the relation between three-phase power supply phase voltages, the three-phase transformer steady-state magnetic flux, transformer core residual magnetic flux, line-to-line voltages and line-to-line steady-state magnetic flux, and line-to-line residual magnetic flux in Embodiment 6 of the invention.
Figure 15:
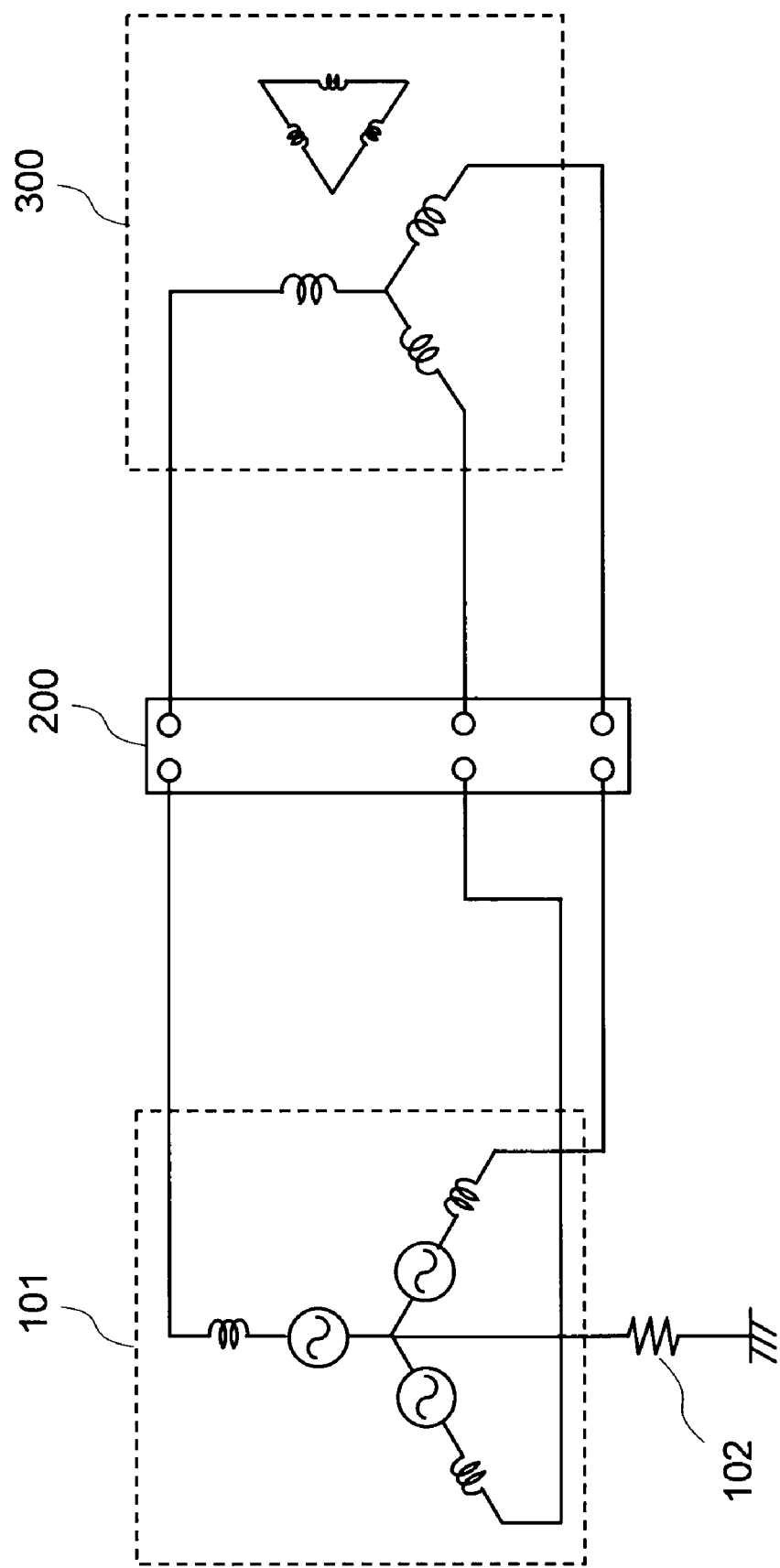
FIG. 15 is a connection diagram showing a Y-Δ connected three-phase transformer installed in a non-effectively grounded system in Embodiment 6 of the invention.
Figure 16:
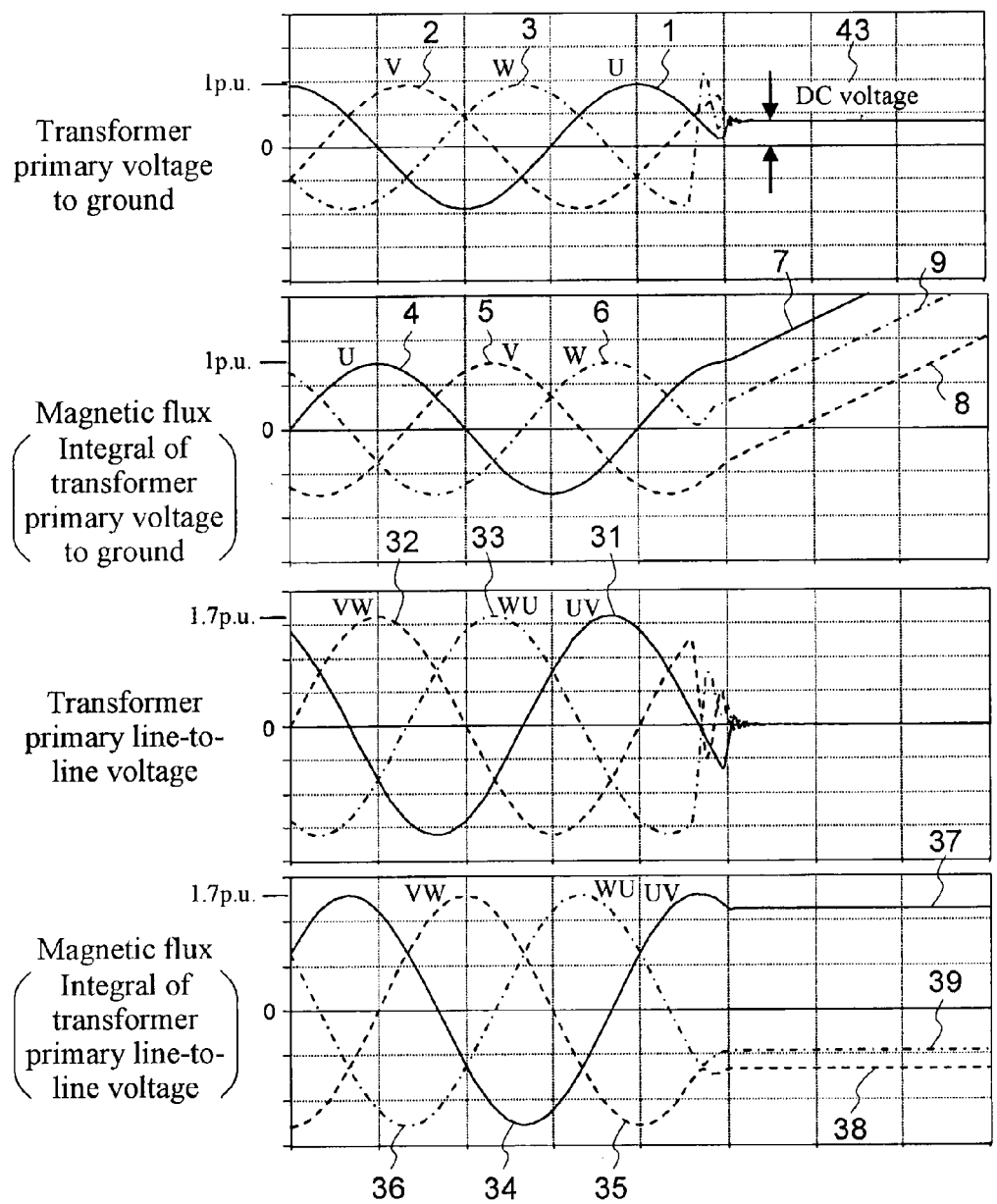
FIG. 16 is a waveform diagram showing that a DC voltage appears at a transformer neutral point after shutoff of the three-phase transformer of FIG. 15 in Embodiment 6 of the invention.

FIG. 13 to FIG. 16 explain Embodiment 6; in particular, FIG. 13 is a block diagram showing the connection relation between the three-phase transformer, three-phase circuit breaker, and magnetizing inrush current suppression device; FIG. 14 is a waveform diagram showing the relation between the power supply phase voltages, transformer steady-state magnetic flux, transformer core residual magnetic flux, line-to-line voltages, line-to-line steady-state magnetic flux, and line-to-line residual magnetic flux; FIG. 15 is a connection diagram showing the Y-Δ connected three-phase transformer installed in a non-effectively grounded system; and FIG. 16 is a waveform diagram showing that a DC voltage appears at the transformer Y-side neutral point after shutting off the three-phase transformer of FIG. 15.

(Configuration)

In FIG. 13, the connection relation between the three-phase transformer, three-phase circuit breaker, and magnetizing inrush current suppression device is the same as in Embodiments 1 to 3; differences from Embodiments 1 to 3 are the provision in the closing control device 600 comprised by the magnetizing inrush current suppression device of steady-state magnetic flux calculation means 602A to calculate the line-to-line steady-state magnetic flux in place of the steady-state magnetic flux calculation means 602 to calculate the steady-state magnetic flux for each phase, as well as the provision of residual magnetic flux calculation means 604A to calculate the line-to-line residual magnetic flux in place of the residual magnetic flux calculation means 604 to calculate the residual magnetic flux for each phase.

Here, the steady-state magnetic flux calculation means 602A calculates the steady-state magnetic flux for each phase by integrating the power supply voltage for each phase (the U, V, W phases) measured by the power supply voltage measurement means 601, and converts the magnetic flux for each phase into a line-to-line magnetic flux. And, the residual magnetic flux calculation means 604A calculates the residual magnetic flux for transformer terminals by integrating the transformer terminal voltages for each phase (the U, V, W phases) measured by the transformer terminal voltage measurement means 603, and converts the results into line-to-line residual magnetic flux.

As a modified example, the voltages for each phase measured by the power supply voltage measuring device 601 may be converted into line-to-line voltages by the steady-state magnetic flux calculation means 602A, and the results integrated to determine each of the line-to-line magnetic fluxes. Similarly, as a modified example, each of the phase voltages measured by the transformer terminal voltage measurement means 603 may be converted into line-to-line voltages by the residual magnetic flux calculation means 604A, and the results integrated to determine each of the line-to-line magnetic fluxes.

Further, among VTs and other voltage measuring devices, there are devices which have internal functions for converting voltages to ground into line-to-line voltages; when such a voltage measuring device is installed, there is no longer a need for the steady-state magnetic flux calculation means 602A or the residual magnetic flux calculation means 604A to convert phase voltages into line-to-line voltages. That is, when converting voltages to ground into line-to-line voltages within the power supply voltage measuring device 400, the line-to-line voltage is measured by the power supply voltage measurement means 601, so that the steady-state magnetic flux calculation means 602A can integrate the line-to-line voltages to determine each line-to-line magnetic flux. Similarly, when converting voltages to ground into line-to-line voltages within the transformer terminal voltage measuring device 500, line-to-line voltages are measured by the transformer terminal voltage measurement means 603, so that the residual magnetic flux calculation means 604A can integrate the line-to-line voltages to determine each line-to-line magnetic flux.

Because the steady-state magnetic flux calculation means 602A and the residual magnetic flux calculation means 604A each calculate line-to-line magnetic fluxes, the phase detection means 605 takes as inputs the output signals from the steady-state magnetic flux calculation means 602A and the output signals from the steady-state magnetic flux calculation means 604A for each line-to-line combination (UV, VW, WU phases), and detects the phase at which the polarities of the steady-state magnetic flux and of the transformer line-to-line residual magnetic flux are the same. The closing command output means 606 takes the output signals from this phase detection means 605 for the three line-to-line combinations (UV, VW, WU phases), and outputs a closing command to the operation mechanism driving the main points of the circuit breaker 200 so as to electrically close the main points of the circuit breaker 200 within the region in which the logical product for the three line-to-line combinations obtains.

(Action)

In FIGS. 14, 1 to 3 are voltages for each power supply phase (the U, V, W phases) measured by the power supply voltage measurement means 601. 4 to 6 are the steady-state magnetic fluxes for each transformer phase (the U, V, W phases) calculated by the steady-state magnetic flux calculation means 602A by integrating the voltages when the three phase voltages 1 to 3 are applied to the transformer in the steady state.

31 to 33 are the line-to-line (UV, VW, WU) voltages obtained by conversion of the three phase voltages 1 to 3 by the steady-state magnetic flux calculation means 602A, and 34 to 36 are line-to-line magnetic fluxes calculated by integration of the line-to-line voltages 31 to 33 by the steady-state magnetic flux calculation means 602A, or obtained by converting the steady-state magnetic fluxes 4 to 6 for each phase. 37 to 39 are the transformer line-to-line (UV, VW, WU) residual magnetic fluxes calculated by the residual magnetic flux calculation means 604A.

In the example of FIG. 14, the transformer UV residual magnetic flux 37 is of positive polarity and the maximum value, and the VW residual magnetic flux 38 and the WU residual magnetic flux 39 are of negative polarity and have the same value. In FIG. 14, in order to distinguish and clearly show the VW residual magnetic flux 38 and the WU residual magnetic flux 39, the two residual magnetic flux lines are intentionally drawn so as not to overlap.

The core residual magnetic fluxes 7 to 9 for each transformer phase (U, V, W phases) are obtained by estimating from the transformer line-to-line (UV, VW, WU) residual magnetic fluxes 37 to 39 calculated by the residual magnetic flux calculation means 604A, or, by calculations in which each of the phase voltages 1 to 3 is integrated to calculate the transformer line-to-line (UV, VW, WU) residual magnetic fluxes 37 to 39 by the residual magnetic flux calculation means 604A.

As is clear from FIG. 14, the polarities of the steady-state magnetic flux and the residual magnetic flux coincide for all three line-to-line combinations (three phases) in the phase region denoted by 40, determined by taking the logical product of signals output by the phase detection means 605 for each line-to-line combination. This phase region 40 is the closing target phase region for the three-phase circuit breaker 200.

In the above-described Embodiments 1 to 4, it was shown that by integrating the transformer primary voltages to ground, calculating the core residual magnetic flux for each phase, and from the residual magnetic flux and the steady-state magnetic flux for each phase, determining the region 42 in which the polarities of the residual magnetic flux and the steady-state magnetic flux for each phase coincide for all three phases as shown in FIG. 14 (equivalent to the region 13 in FIG. 2 and to the regions 20 and 21 in FIG. 4), if the three-phase circuit breaker 200 is then closed taking this region 42 as the closing target phase region, large magnetizing inrush currents can be suppressed.

In FIG. 14, the closing target phase region 40 set from the line-to-line magnetic flux is within "the region 42 in which the polarities of the residual magnetic flux and the steady-state magnetic flux for each phase coincide for all three phases", and if the transformer 300 is magnetized by closing the three-phase circuit breaker 200 in this closing target phase region 40, large magnetizing inrush currents can be suppressed.

When closing the circuit breaker 200, there exists variation in the closing time arising from variation in operation of the operating mechanism. By acquiring the characteristics in advance, variation in the circuit breaker closing time can be corrected by a control device which executes phase control; and even when such variation exists, it is of course possible to close the circuit breaker 200 within the closing target phase region 40 in FIG. 14.

(Advantageous Effects)

FIG. 16 shows the transformer primary voltages to ground when a transformer with a primary-side Y connection, the neutral point of which is not grounded, such as shown in FIG. 15, is shut off by a three-phase circuit breaker 200, as well as the magnetic fluxes calculated by integrating the voltages to ground, the line-to-line voltages, and the magnetic fluxes calculated by integrating these voltages.

In FIG. 16, after the three-phase circuit breaker 200 has shut off current, a DC voltage 43 appears in the transformer primary-side voltages to ground. The voltage at the Y-connected neutral point is the same as the DC voltage 43.

When integrating transformer terminal voltages to calculate residual magnetic flux, the DC voltage 43 is integrated in order to calculate the residual magnetic flux after shutoff, so that the residual magnetic flux for each phase 7 to 9 increases with time, and finally diverge. Hence if terminal voltages are integrated to calculate the residual magnetic flux, clearly the residual magnetic flux cannot be calculated accurately.

On the other hand, when line-to-line voltages are taken into account, the UV line-to-line voltage, for example, is obtained by subtracting the V phase voltage to ground from the U phase voltage to ground. As is clear from the DC voltage 43 shown in FIG. 16, the transformer primary-side voltages to ground for each phase after circuit breaker shutoff have a DC voltage of the same magnitude. Hence the effect of this DC voltage does not appear in the line-to-line voltages 31 to 33 calculated by taking the differences of primary voltages to ground. If these line-to-line voltages 31 to 33 are integrated, there is no divergence of the magnetic fluxes, as indicated by the line-to-line residual magnetic fluxes 37 to 39 in FIG. 16, so that the residual magnetic flux can be determined accurately without being affected by the DC voltage 43. Hence if the line-to-line voltages are integrated to determine the relation between steady-state magnetic flux and residual magnetic flux, the circuit breaker closing phase can be decided without being affected by the DC voltage, even when a DC voltage appears at the neutral point after the transformer has been shut off.

As explained above, line-to-line voltages are differences in voltages to ground, and the magnetic flux is obtained by voltage integration. Hence after converting voltages to ground into line-to-line voltages and then integrating the result to calculate magnetic flux, or after integrating voltages to ground to calculate magnetic flux for each phase and taking the differences of the magnetic fluxes, the line-to-line residual magnetic flux can of course be calculated without being affected by the neutral point DC voltage.

In the example of FIG. 15, 101 is the power system, and 102 is the power supply-side neutral point impedance. In this example, a state is shown in which there is no transformer neutral point impedance; but in a non-effectively grounded system, there are cases in which an impedance is connected to the transformer neutral point. The impedance connected to the neutral point is often a resistance of large value, and in this case also a DC voltage appears at the transformer neutral point, so advantageous effects similar to those of Embodiment 6 are obtained.

(Embodiment 7)

Figure 17:
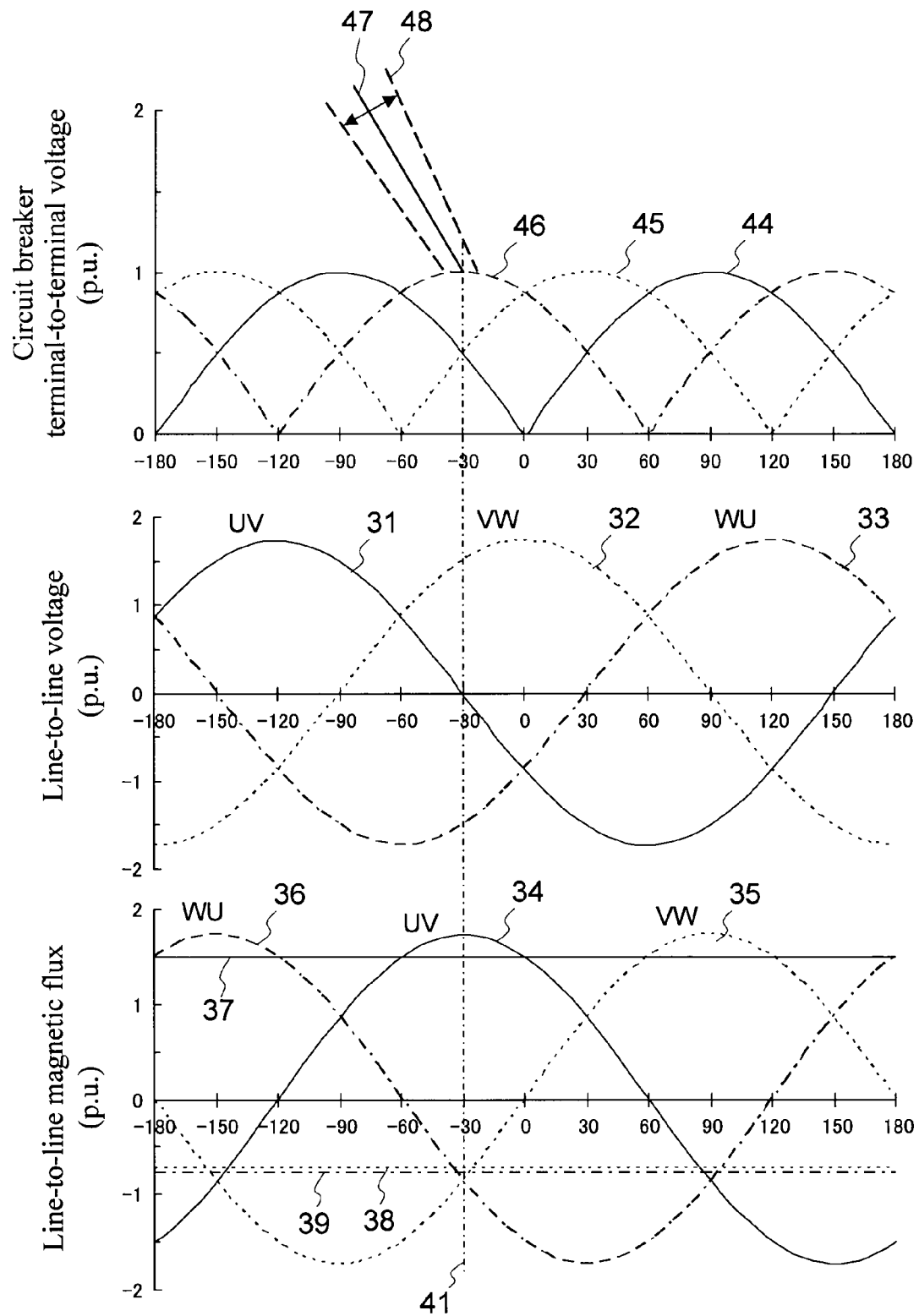
FIG. 17 is a waveform diagram showing a closing target setting in Embodiment 7 of the invention.
Figure 18:
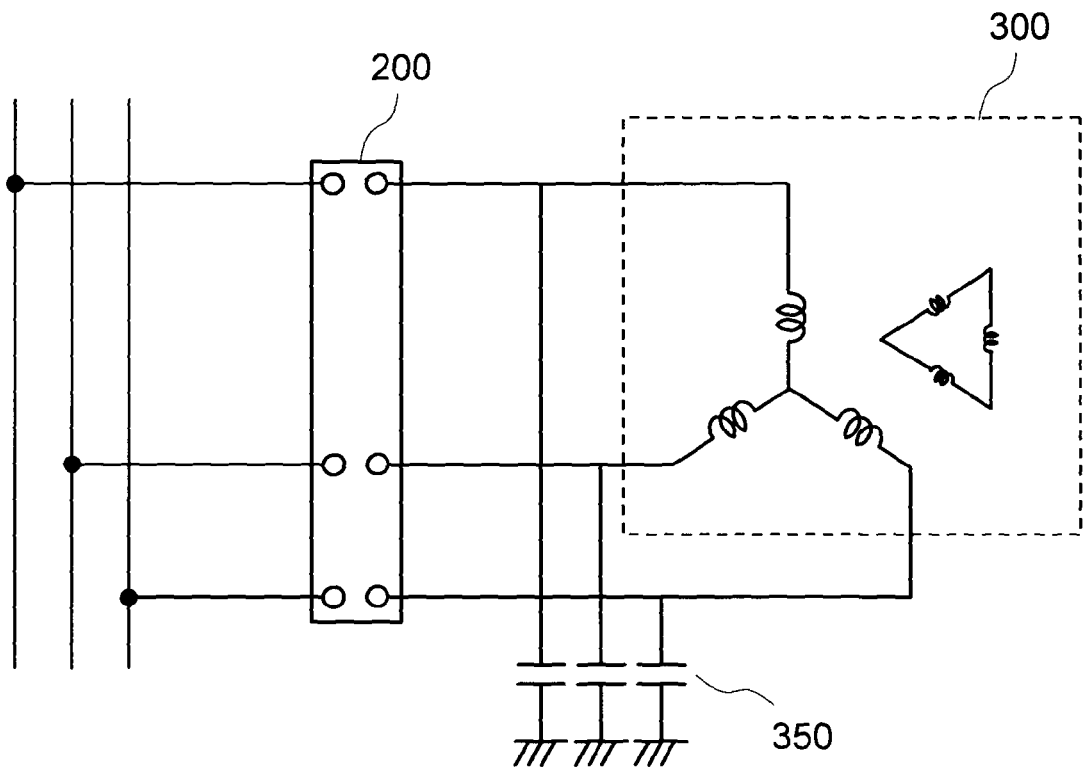
FIG. 18 is a connection diagram showing a Y-Δ connected three-phase transformer installed in a non-effectively grounded system in Embodiment 7 of the invention.
Figure 19:
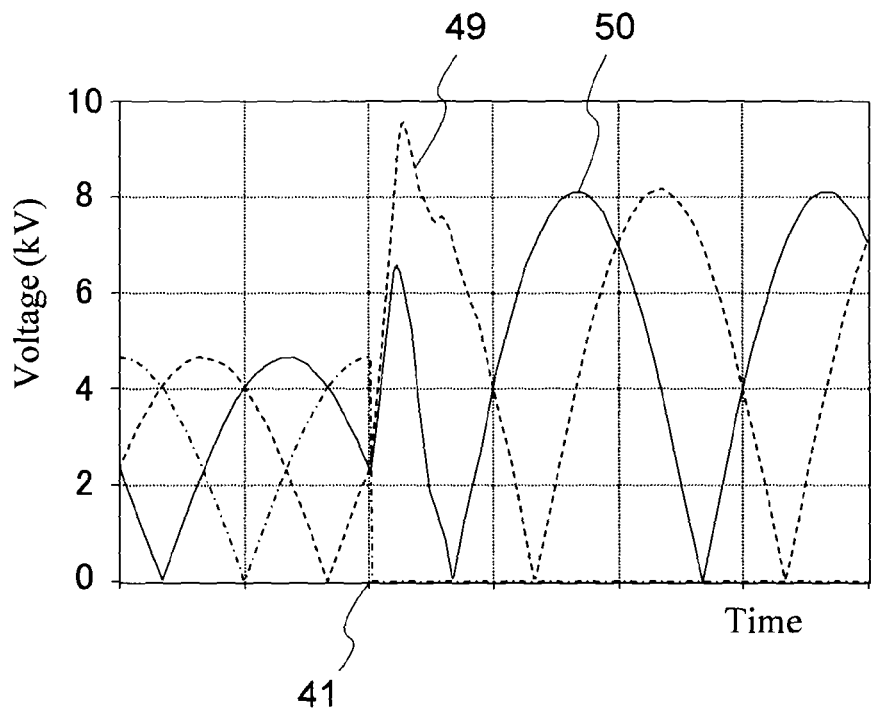
FIG. 19 is a waveform diagram explaining voltage changes of other phases when only one phase of the transformer is supplied with power, in the three-phase transformer of FIG. 18 in Embodiment 7 of the invention.
Figure 20:
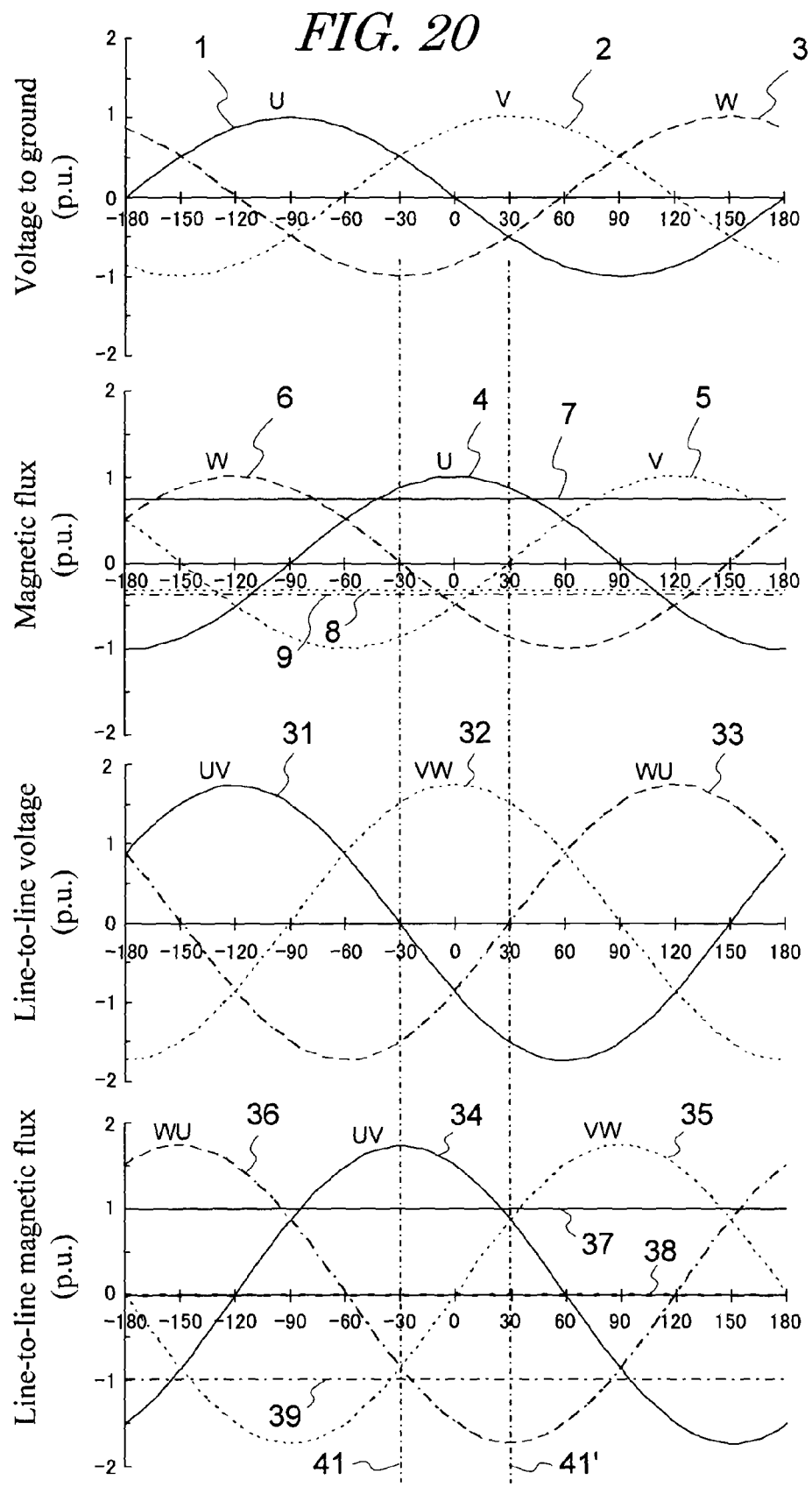
FIG. 20 is a waveform diagram showing the relation between three-phase power supply phase voltages, the three-phase transformer steady-state magnetic flux, transformer core residual magnetic flux, line-to-line voltages and line-to-line steady-state magnetic flux, and line-to-line residual magnetic flux in Embodiment 7 of the invention.

FIG. 17 to FIG. 20 explain Embodiment 7; FIG. 17 is obtained from the waveform of FIG. 14 by rewriting the voltages to ground as circuit breaker electrode-electrode voltages, and deleting the magnetic flux waveforms. FIG. 18 is a connection diagram showing a Y-Δ connected three-phase transformer installed in a non-effectively grounded system, and FIG. 19 explains voltage changes for other phases after the circuit breaker is closed for only one phase, when the three-phase transformer of FIG. 18 is supplied with power. FIG. 20 is a waveform diagram showing the relation between power supply phase voltages, line-to-line voltages, steady-state magnetic flux, and residual magnetic flux at the time of supplying power to three-phase transformer, assuming a case in which the manner in which the line-to-line residual magnetic flux remains is different from that of FIG. 17. In Embodiment 7, the connection relation between the three-phase transformer, three-phase circuit breaker, and magnetizing inrush current suppression device is the same as in Embodiment 6 described above, so a block diagram equivalent to FIG. 13 is omitted.

(Configuration)

In this Embodiment 7, the closing control device 600 is set such that the point at which the steady-state magnetic flux is largest in the region in which the polarities of the steady-state magnetic flux and residual magnetic flux coincide for the line combination with largest residual magnetic flux among the line combinations of the three-phase transformer 300, that is, the line-to-line voltage zero point 41, is the closing target point of the three-phase circuit breaker 200.

(Action)

In FIG. 17, 47 denotes the pre-arcing voltage during closing of the circuit breaker 200. It is known that, when the circuit breaker is closed in the state in which voltages are induced across the circuit breaker electrodes, prior to mechanical contact of the circuit breaker contacts, advance discharge called pre-arcing occurs, resulting in an electrically closed state. The voltage at which pre-arcing occurs is larger for larger contact-contact distances. Hence as shown in FIG. 17, the pre-arcing voltage 47 at the time of circuit breaker closing decreases along the time axis. Further, it is well known that this pre-arcing voltage exhibits variation 48.

The setting conditions for the closing target point 41 in FIG. 17 show that the circuit breaker can be electrically closed at the peak value of the W phase circuit breaker electrode-to-electrode voltage 46. However, at this closing target point 41, the circuit breaker electrode-electrode voltages 45, 46 for the other phases U and V are 0.5 p.u., and under these conditions the closing times for the U and V phases lag behind, so that the closing does not occur simultaneously for the three phases of the circuit breaker.

On the other hand, FIG. 19 shows the resulting waveforms obtained by calculating the changes 49, 50 in the circuit breaker electrode-electrode voltages for other phases when the circuit breaker 200 is closed for a single phase at the closing target point 41, for the conditions of a 3.3 kV-415 V-300 kVA transformer with Y-$\Delta$ connections as shown in FIG. 18.

In FIG. 19, as indicated by the changes 49, 50 in the circuit breaker electrode-electrode voltages, clearly the electrode-electrode voltages for other phases rise rapidly and become large accompanying transient oscillations after closing of the circuit breaker 200 for only one phase at the closing target point 41. This is attributed to charging of stray capacitance (350 in FIG. 18) across the transformer primary terminals and the circuit breaker from the unclosed phase terminals of the transformer due to the voltage of the closed phase. After convergence of the transient oscillations, the electrode-electrode voltages of the other phases are of magnitude $\sqrt{3}$ p.u.

Thus it is clear that, when at the closing target point 41 in FIG. 17 the three-phase circuit breaker is closed, after the closing state in which there is advance discharge of one phase, the other phases immediately also enter the closing state of advance discharge, and the time difference in closing for the three-phase circuit breaker can be made extremely small.

FIG. 20 is a waveform diagram showing the circuit breaker closing target when conditions for the residual magnetic flux are different from those of FIG. 17. In FIG. 20, the conditions are such that the UV residual magnetic flux 37 is of positive polarity and maximum, the VW residual magnetic flux 38 is 0, and the WU residual magnetic flux 39 is of negative polarity and has the same absolute value as the UV residual magnetic flux 37. At this time, the closing target point 41 is set by the UV residual magnetic flux 37 and the UV steady-state magnetic flux 34. On the other hand, the closing target point 41' is set by the WU residual magnetic flux 39 and the WU steady-state magnetic flux 36.

In FIG. 20, at the closing target point 41 the W phase voltage to ground 3 is at peak, and this means that the circuit breaker W phase electrode-electrode voltage is at peak. On the other hand, at the closing target point 41' the V phase voltage to ground is at peak, and so the circuit breaker V phase electrode-electrode voltage is at peak. That is, as explained above, clearly whichever of the closing target points or 41' is taken as the closing target, the time difference in closing among the three phases of the circuit breaker can be reduced.

(Advantageous Effects)

By means of this Embodiment 7, the variation in closing among the phases at the time of circuit breaker closing can be reduced, and if the three-phase circuit breaker 200 is closed at the closing target point 41 to magnetize the transformer 300, large magnetizing inrush currents can be suppressed.

(Embodiment 8)

Figure 21:
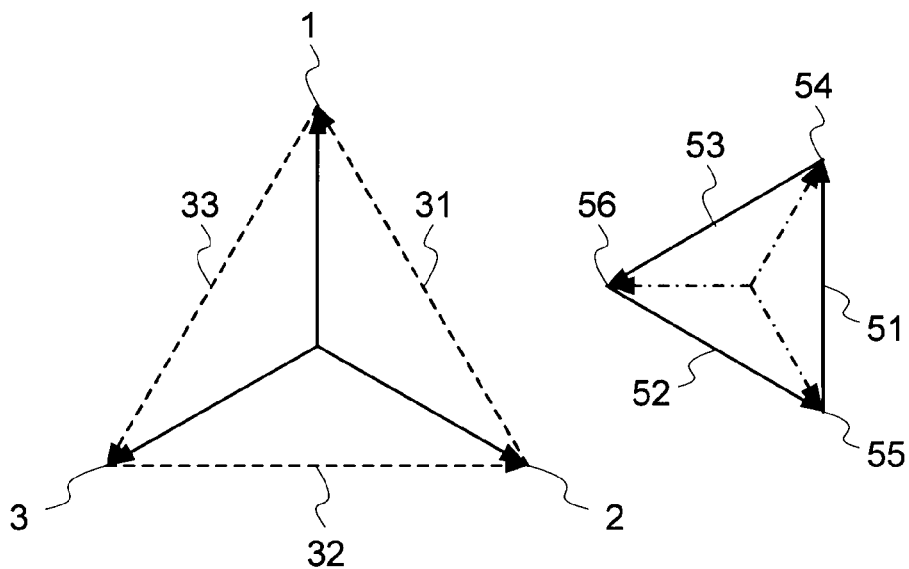
FIG. 21 is a waveform diagram showing the relation between the primary Y-side phase voltages and line-to-line voltages, and the secondary or tertiary Δ-side voltages to ground and line-to-line voltages, of a three-phase transformer in Embodiment 8 of the invention.
Figure 22:
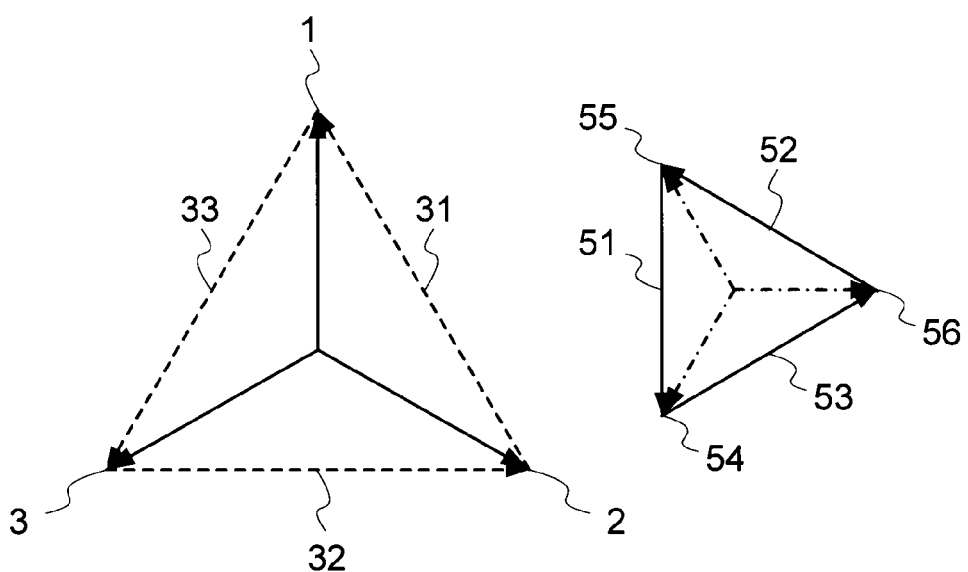
FIG. 22 is a waveform diagram showing the relation between the primary Y-side phase voltages and line-to-line voltages, and the secondary or tertiary Δ-side voltages to ground and line-to-line voltages, of a three-phase transformer in Embodiment 8 of the invention, with a phase relation different from that of FIG. 21.

FIG. 21 and FIG. 22 explain Embodiment 8, and show the phase relations between the primary Y-side phase voltages and line-to-line voltages, and the secondary or tertiary $\Delta$-side voltages to ground and line-to-line voltages. In this Embodiment 8, the connection relation between the three-phase transformer, three-phase circuit breaker, and magnetizing inrush current suppression device is the same as in Embodiments 6 and 7 described above, and so a block diagram equivalent to FIG. 13 is omitted.

(Configuration)

In Embodiment 8, when a voltage division device is not installed on the transformer primary Y side, by measuring the voltages to ground on the secondary or tertiary $\Delta$ connection side, the primary-side line-to-line voltages are obtained.

(Action)

FIG. 21 shows a case in which the phase sequence relation on the Y side and $\Delta$-side is +30°. In FIG. 21, the $\Delta$-side W phase voltage to ground 56 is directed opposite to the vector of the primary Y-side VW line-to-line voltage 32. The relations are similar between the $\Delta$-side V phase voltage to ground 55 and the Y-side UV line-to-line voltage 31, and between the $\Delta$-side U phase voltage to ground 54 and the Y-side WU line-to-line voltage 33. That is, if the $\Delta$-side voltages to ground are measured, and the voltage polarities are inverted for all three phases, then the phase is the same as for the primary Y-side line-to-line voltages.

Here, the above-described DC voltage (43 in FIG. 16) appearing at the neutral point after transformer shutoff is a zero-phase voltage, and from the symmetrical component method, clearly there is no effect on the $\Delta$-side. Hence by measuring the $\Delta$-side voltages to ground and integrating, the same results are obtained as when integrating the primary Y-side line-to-line voltages to calculate magnetic flux, and a closing target point 41 such as shown in FIG. 14, FIG. 17 and FIG. 20 can be set.

FIG. 21 shows a case in which the phase sequence relation on the Y side and $\Delta$-side is +30°, but as shown in FIG. 22, similar action is of course obtained even when the phase sequence is −30°.

That is, as shown in FIG. 22, when the phase sequence relation is −30°, the $\Delta$-side V phase voltage to ground 55 is directed in the same direction as the vector of the primary Y-side UV line-to-line voltage 31. Similar relations obtain for the $\Delta$-side U phase voltage to ground 54 and the Y-side WU line-to-line voltage 33, and for the $\Delta$-side W phase voltage to ground 56 and the Y-side VW line-to-line voltage 32. Hence if the $\Delta$-side voltages to ground are measured and the voltages are of the same polarity for all three phases, then the phase is the same as for the primary Y-side line-to-line voltages.

(Advantageous Effects)

By means of Embodiment 8, even when a voltage dividing device is not installed on the transformer primary side, the primary-side line-to-line magnetic fluxes can be calculated, and the closing target for the circuit breaker can be set, so that large magnetizing inrush currents can be suppressed.

(Modified Example)

The DC voltage 43 appearing in the transformer primary voltages to ground shown in FIG. 16 is a zero-phase voltage, and so by adding the voltages to ground for the three phases, dividing the result by 3, and subtracting from the original voltages to ground, the DC voltage of the voltages to ground can be made 0. In addition, if magnetic fluxes are calculated and the circuit breaker closing target is set, of course large magnetizing inrush currents can be suppressed without being affected by the DC voltage appearing at the neutral point.

(Embodiment 9)

Figure 23:
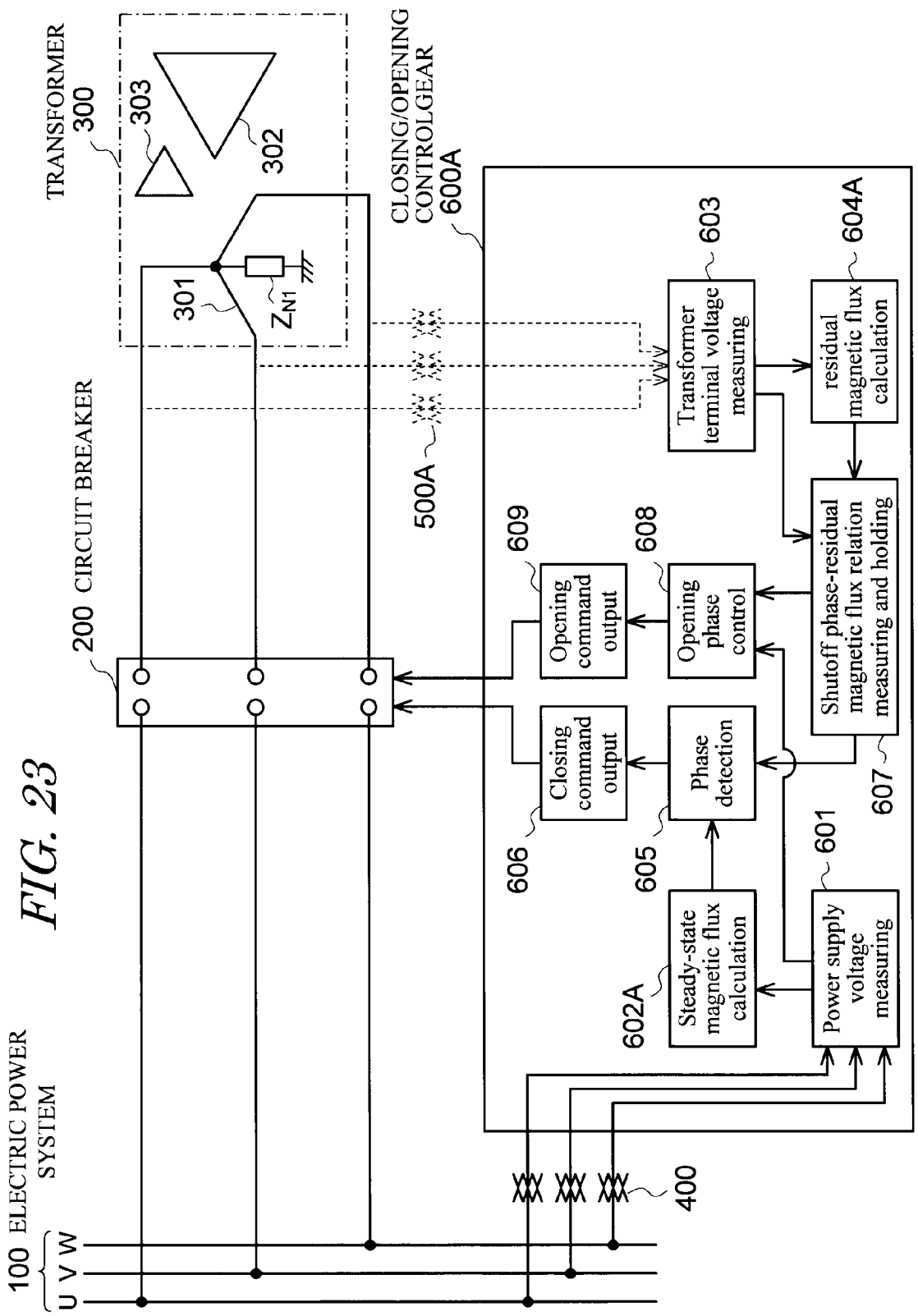
FIG. 23 is a block diagram showing the connection relation between a three-phase transformer, three-phase circuit breaker, and magnetizing inrush current suppression device in Embodiment 9 of the invention.
Figure 24:
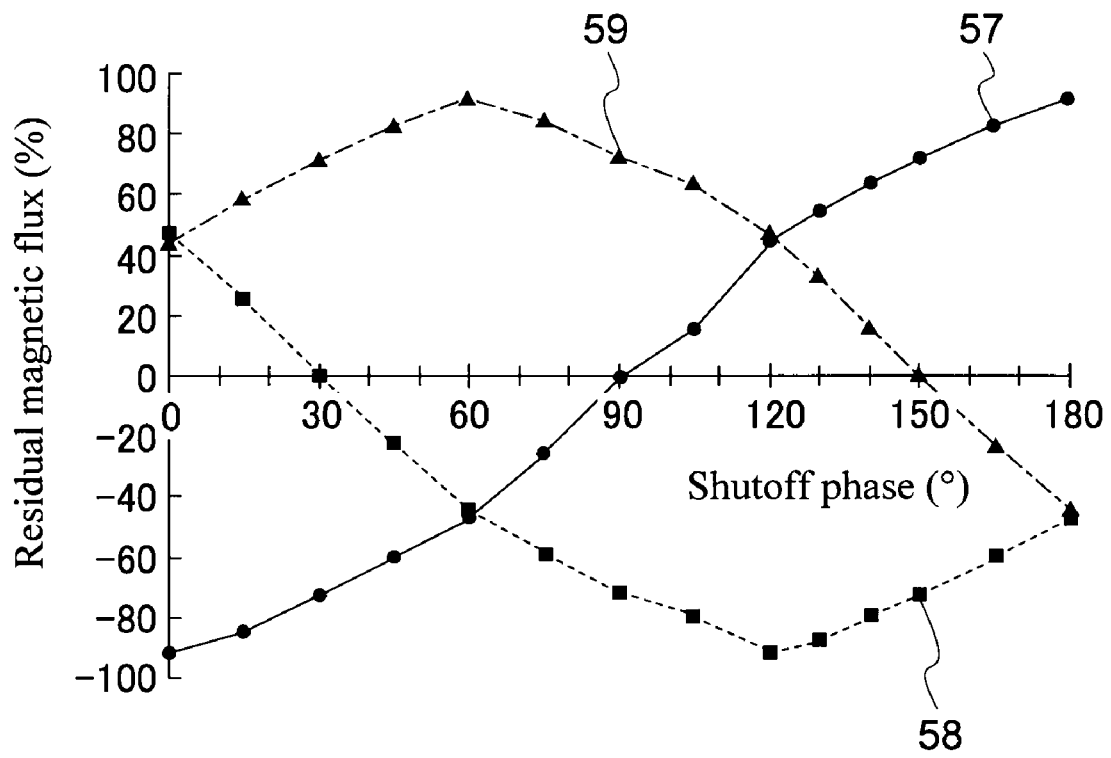
FIG. 24 shows an example of calculated results for the shutoff phase and line-to-line residual magnetic flux when three single-phase transformers are connected with Y and Δ connections, and are shut off with a circuit breaker, in Embodiment 9 of the invention.

FIG. 23 and FIG. 24 explain Embodiment 9; in particular, FIG. 23 is a block diagram showing the connection relation between the three-phase transformer, three-phase circuit breaker, and magnetizing inrush current suppression device, and FIG. 24 shows an example of line-to-line residual magnetic fluxes calculated when three single-phase transformers are connected using Y-Δ connections, and the three-phase transformer is shut off by a circuit breaker, with the shutoff phase varied.

(Configuration)

In FIG. 23, the power system configuration is the same as for FIG. 13, but differences with FIG. 13 are the fact that the secondary windings 302 of the transformer 300 are Δ-connected, and moreover that, when in the normal operation state of the transformer 300 a transformer terminal voltage measuring device 500 is not installed at either the primary-side terminals, the secondary-side terminals, or the tertiary-side terminals, a transformer terminal voltage measuring device for temporary connection 500A is connected to the primary-side terminals, and the output voltage thereof is input to the voltage measurement means 603 of the closing/opening control device 600A. As a modified example, the transformer terminal voltage measuring device 500A may be connected to the secondary or tertiary terminals.

This closing/opening control device 600A is provided in place of the closing control device 600 of Embodiment 6; constituent components from the power supply voltage measurement means 601 to the closing command output means 606 are common with the closing control device 600 of Embodiment 6, whereas the shutoff phase/residual magnetic flux relation measuring and holding means 607, opening phase control means 608, and opening command output means 609, have been added, in a configuration conforming to the closing/opening control device 600A of Embodiment 4.

In other words, the closing/opening control device 600A of Embodiment 9 is similar to the closing/opening control device 600A of Embodiment 4, but with steady-state magnetic flux calculation means 602A which calculates line-to-line steady-state magnetic fluxes provided in place of the steady-state magnetic flux calculation means 602 which calculates the steady-state magnetic flux for each phase, and with residual magnetic flux calculation means 604A which calculates line-to-line residual magnetic fluxes provided in place of the residual magnetic flux calculation means 604 which calculates residual magnetic flux for each phase.

FIG. 24 shows, as an example, the line-to-line residual magnetic fluxes calculated, with the shutoff phase varied, when three 3.3 kV-415 V-300 kVA single-phase transformers are Y-Δ connected, and the three phases of the transformer 300 are shut off using a circuit breaker 200.

As explained above, with the three-phase transformer 300 in the normal operating state, when a transformer terminal voltage measuring device 500 is not installed at either the primary-side terminals, secondary-side terminals, or tertiary-side terminals, with the transformer terminal voltage measuring device 500A temporarily connected the circuit breaker 200 is shut off at least once (generally a plurality of times), and the characteristics of each of the transformer line-to-line residual magnetic fluxes with respect to the shutoff phase of the circuit breaker, as shown in FIG. 24, are measured.

The transformer terminal voltage measuring device 500A is connected in order to measure the line-to-line residual magnetic flux characteristics, as shown in FIG. 24, and is removed in the normal operating state. Of course, the transformer terminal voltage measuring device 500A may be installed permanently. It is sufficient to obtain the relation between shutoff phase and residual magnetic flux, and so there is no need to measure in detail the residual magnetic flux characteristics as shown in FIG. 24.

When shutting off the transformer 300 using the circuit breaker 200 in normal operation, the opening command output means 609 controls the opening phase of the circuit breaker during shutoff such that the shutoff phase is always the same. By this means, each of the line-to-line residual magnetic fluxes can be estimated from the residual magnetic flux characteristics, as shown in FIG. 24, measured in advance.

(Action)

Once the circuit breaker 200 and transformer 300 have been installed in the power system, the circuit conditions for the power system (in the case of FIG. 23, the circuit conditions from the power system 100 to the transformer 300) are always the same, and so if the phase at which the circuit breaker 200 is shut off is always the same, then the values of the line-to-line residual magnetic flux of the transformer 300 should also always be the same.

Hence even in cases in which a voltage measuring device is not always connected to any of the primary to tertiary terminals of the transformer 300, information on the residual magnetic flux of the transformer 300 after shutoff by the circuit breaker 200 at a prescribed phase can always be obtained.

As explained above, if voltage information is available from the busbar voltage measuring device and other power supply voltage measuring device which is always installed in transformer substations, then the transformer steady-state magnetic flux can be calculated even when transformer terminal voltage measuring devices are not installed. Hence even when transformer terminal voltage measuring devices are not present, phase-controlled closing of the circuit breaker 200 is possible.

(Advantageous Effects)

Residual magnetic flux information after shutoff of the transformer by the circuit breaker is ascertained in advance through measurements with a voltage measuring device temporarily connected, so that the relation between the residual magnetic flux and the steady-state magnetic flux can be obtained even when transformer terminal voltages are not measured at each shutoff, and by applying the phase detection method of the above-described Embodiments 6 to 8, large magnetizing inrush currents can be suppressed at the time of input of the power supply to the transformer 300 by the circuit breaker 200.

Further, the transformer steady-state magnetic flux, that is, the magnetic flux when a voltage is applied to the transformer in the steady state, can be determined by integrating the voltages measured by a power supply voltage measuring device installed on a busbar or similar.

The invention claimed is:

1. A magnetizing inrush current suppression method for a three-phase transformer having primary windings Y-connected and secondary windings or tertiary windings any of which are Δ-connected, the transformer being connected to a three-phase power supply via circuit breakers coupled with each of three phases to interrupt power supplying to the transformer, the method comprising the steps of:
    calculating steady-state magnetic flux for each of the three phases of the transformer by integrating each phase-voltage or phase-to-phase voltage of the three phases on the primary, the secondary, or the tertiary windings side obtained when AC voltage is applied in a steady state to the three phases of the transformer;

calculating polarity and magnitude of residual magnetic flux for each of the three phases of the transformer after the circuit breakers shuts off the transformer;

detecting voltage-phase for each of the three phases of the transformer and determining a region in which polarity of the steady-state magnetic flux coincides with polarity of the residual magnetic flux; and causing the circuit breakers to close simultaneously in an area where the region of each of the three phases overlaps with each other, thereby suppressing a magnetizing inrush current occurring at the start of energizing of the three-phase transformer.

2. The magnetizing inrush current suppression method for a three-phase transformer according to claim 1, wherein a point of intersection of the steady-state magnetic flux and the residual magnetic flux in the phase of which the residual magnetic flux is smallest is taken as a closing target to cause simultaneous closing of the circuit breakers.

3. The magnetizing inrush current suppression method for a three-phase transformer according to claim 1, wherein a zero point of the voltage in the phase of which the residual magnetic flux is largest is taken as a closing target to cause simultaneous closing of the circuit breakers, thereby energizing the three-phase transformer.

4. A magnetizing inrush current suppression method for a three-phase transformer installed in an isolated neutral system, having primary windings Δ-connected, and the secondary windings or tertiary windings any of which are Δ-connected, the transformer being connected to a three-phase power supply via circuit breakers coupled with each of three phases to interrupt power supplying to the transformer, the method comprising the steps of:

calculating steady-state magnetic flux for each of the three phases of the transformer by integrating each phase-to-phase voltage of the three phases on the primary, the secondary, or the tertiary windings side obtained when AC voltage is applied in a steady state to the three phases of the transformer;

calculating polarity and magnitude of residual magnetic flux for each of the three phases of the transformer after the circuit breakers shuts off the transformer;

detecting voltage-phase for each of the three phases of the transformer and determining a region in which polarity of the steady-state magnetic flux coincides with polarity of the residual magnetic flux; and causing the circuit breakers to close simultaneously in an area where the region of each of the three phases overlaps with each other, thereby suppressing a magnetizing inrush current occurring at the start of energizing of the three-phase transformer.

5. The magnetizing inrush current suppression method for a three-phase transformer according to claim 4, wherein a point of intersection of the steady-state magnetic flux and the residual magnetic flux in the phase of which the residual magnetic flux is smallest is taken as a closing target to cause simultaneous closing of the circuit breakers.

6. The magnetizing inrush current suppression method for a three-phase transformer according to claim 4, wherein a zero point of the phase-to-phase voltage between the phases of which the residual magnetic flux is largest is taken as a closing target to cause simultaneous closing of the three-phase circuit breaker, thereby energizing of the three-phase transformer.

7. A magnetizing inrush current suppression method for a three-phase transformer, having the primary windings Y connected and the secondary windings or tertiary windings any of which are Δ-connected, the transformer being connected to a three-phase power supply via circuit breakers coupled with each of three phases to interrupt power supplying to the transformer, the method comprising the steps of:

determining in advance a relation between shutoff phase of the circuit breaker and residual magnetic flux of the transformer from a voltage obtained by performing an operation to open the circuit breakers at least once and measured by a measuring device connected to the primary, the secondary, or the tertiary windings side of the transformer;

estimating the residual magnetic flux of the transformer from the relation by controlling the opening phase of the circuit breaker such that the shutoff phase is always the same when the circuit breaker shuts off the transformer;

calculating steady-state magnetic flux for each of the three phases of the transformer by integrating each phase-voltage or phase-to-phase voltage of the three phases on the primary, the secondary, or the tertiary windings side obtained when AC voltage is applied in a steady state to the three phases of the transformer;

detecting voltage-phase for each of the three phases of the transformer and determining a region in which polarity of the steady-state magnetic flux coincides with polarity of the residual magnetic flux; and causing the circuit breakers to close simultaneously in an area where the region of each of the three phases overlaps with each other, thereby suppressing a magnetizing inrush current occurring at the start of energizing of the three-phase transformer.

8. The magnetizing inrush current suppression method for a three-phase transformer according to claim 7, wherein a point of intersection of the steady-state magnetic flux and the residual magnetic flux in the phase of which the residual magnetic flux is smallest is taken as a closing target to cause simultaneous closing of the circuit breakers.

9. The magnetizing inrush current suppression method for a three-phase transformer according to claim 7, wherein a zero point of the phase-voltage in the phase of which the residual magnetic flux is largest is taken as a closing target to cause simultaneous closing of the circuit breakers, thereby energizing of the three-phase transformer.

10. A magnetizing inrush current suppression method for a three-phase transformer installed in an isolated neutral system, having the primary windings Δ-connected and the secondary windings or tertiary windings any of which are Δ-connected, the transformer being connected to a three-phase power supply via circuit breakers coupled with each of three phases to interrupt power supplying to the transformer, the method comprising the steps of:

determining in advance a relation between shutoff phase of the circuit breaker and residual magnetic flux of the transformer from a voltage obtained by performing an operation to open the circuit breakers at least once and measured by a measuring device connected to the primary, the secondary, or the tertiary windings side of the transformer;

estimating the residual magnetic flux of the transformer from the relation by controlling the opening phase of the circuit breaker so that the shutoff phase is always the same when the circuit breaker shuts off the transformer;

calculating steady-state magnetic flux for each of the three phases of the transformer by integrating each phase-to-phase voltage of the three phases on the primary, the secondary, or the tertiary windings side obtained when AC voltage is applied in a steady state to the three phases of the transformer;

detecting voltage-phase for each of the three phases of the transformer and determining a region in which polarity of the steady-state magnetic flux coincides with polarity of the residual magnetic flux; and causing the circuit breakers to close simultaneously in an area where the region of each of the three phases overlaps with each other, thereby suppressing a magnetizing inrush current occurring at the start of energizing of the three-phase transformer.

11. The magnetizing inrush current suppression method for a three-phase transformer according to claim 10, wherein a point of intersection of the steady-state magnetic flux and the residual magnetic flux in the phase of which the residual magnetic flux is smallest is taken as a closing target to cause simultaneous closing of the circuit breakers.

12. The magnetizing inrush current suppression method for a three-phase transformer according to claim 10, wherein a zero point of the phase-to-phase voltage between the phases of which the residual magnetic flux is largest is taken as a closing target to cause simultaneous closing of the circuit breakers, thereby energizing of the three-phase transformer.

13. The magnetizing inrush current suppression method for a three-phase transformer according to any one of claims 1 to 12, wherein the circuit breakers for the three phases are operated simultaneously.

14. A magnetizing inrush current suppression device for a three-phase transformer, having primary windings Y-connected and the secondary windings or tertiary windings any of which are Δ-connected, the transformer being connected to a three-phase power supply via circuit breakers coupled with each of the three phases to interrupt power supplying to the transformer, the device comprising:

a first calculation part which is connected to the three phases and calculates steady-state magnetic flux of each phase of the transformer by integrating each phase-voltage or each phase-to-phase voltage on the primary, the secondary, or the tertiary windings side obtained when AC voltage is applied in a steady state to the three phases of the transformer;

a second calculation part which is connected to the three phases at any of the primary, the secondary, or the tertiary windings side of the transformer and calculates polarity and magnitude of residual magnetic flux of each phase of the transformer after the circuit breaker shuts off the transformer;

a phase detection part which detects voltage-phase for each of the three phases of the transformer, determines a region in which polarity of the steady-state magnetic coincides with polarity of the residual magnetic flux, and further determines an area where the region of each of the three phases overlaps with each other; and a closing part which causes the circuit breakers to close simultaneously in the area determined by the phase detection part, thereby suppressing a magnetizing inrush current occurring at the start of energizing of the three-phase transformer.

15. A magnetizing inrush current suppression device for a three-phase transformer installed in an isolated neutral system and having primary windings Δ-connected and secondary windings or tertiary windings any of which are Δ-connected, the transformer being connected to a three-phase power supply via circuit breakers coupled with each of the three phases to interrupt power supplying to the transformer, the device comprising:

a first calculation part which is connected to the three phases and calculates the steady-state magnetic flux of each phase of the transformer by integrating each phase-to-phase voltage of the three phases on the primary, the secondary, or the tertiary windings side obtained when AC voltages is applied in a steady state to the three phases of the transformer;

a second calculation part which is connected to the three phases at any of the primary, the secondary, or the tertiary windings side of the transformer and calculates polarity and magnitude of the residual magnetic flux of each phase of the transformer after the circuit breaker shuts off the transformer;

a phase detection part which detects voltage-phase for each of the three phases of the transformer, determines a region in which polarity of the steady-state magnetic coincides with polarity of the residual magnetic flux, and further determines an area where the region of each of the three phases overlaps with each other; and a closing part which causes the circuit breakers to close simultaneously in the area determined by the phase detection part, thereby suppressing a magnetizing inrush current occurring at the start of energizing of the three-phase transformer.

16. A magnetizing inrush current suppression device for a three-phase transformer having primary windings Y-connected and secondary windings or tertiary windings any of which are Δ-connected, the transformer being connected to a three-phase power supply via circuit breakers coupled with each of three phases to interrupt power supplying to the transformer, the device comprising:

a first calculation part which is connected to the three phases and calculates steady-state magnetic flux for each of the three phases of the transformer by integrating each phase-voltage or phase-to-phase voltage of the three phases on the primary, the secondary, or the tertiary windings side obtained when AC voltage is applied in a steady state to the three phases of the transformer;

a second calculation part which is connected to the three phases at any of the primary, the secondary, or the tertiary windings side of the transformer and calculates polarity and magnitude of residual magnetic flux of each phase of the transformer after the circuit breaker shuts off the transformer a shutoff phase/residual magnetic flux relation measuring and holding part which measures and holds relational data between shutoff phase of the circuit breakers and the residual magnetic flux of the transformer;

an opening phase control part which controls opening phase of the circuit breakers such that the shutoff phase is always the same when the circuit breaker shuts off the transformer;

an output part which outputs an opening command to the circuit breaker through an output from the opening phase control part;

a phase detection part which detects voltage-phase for each of the three phases of the transformer, determines a region in which polarity of the steady-state magnetic coincides with polarity of the residual magnetic flux, and further determines an area where the region of each of the three phases overlaps with each other; and; and a closing part which causes the circuit breakers to close simultaneously in the area determined by the phase detection part, thereby suppressing a magnetizing inrush current occurring at the start of energizing of the three-phase transformer.

17. The magnetizing inrush current suppression device for a three-phase transformer according to claim 16, wherein the shutoff phase/residual magnetic flux relation measuring and holding part determines in advance a relation between the shutoff phase of the circuit breaker and the residual magnetic flux of the transformer from a voltage obtained by performing an operation to open the circuit breakers at least once and measured by a measuring device connected to the primary, the secondary, or the tertiary windings side of the transformer.

18. A magnetizing inrush current suppression method for a three-phase transformer having primary windings Y-connected and secondary windings or tertiary windings any of which are Δ-connected, the transformer being connected to a three-phase power supply via circuit breakers coupled with each of three phases to interrupt power supplying to the transformer, the method comprising the steps of:
   measuring voltages of the three phases on the primary windings side obtained when AC voltage is applied in a steady state to the three phases of the transformer;
   converting the voltages of the three phases into phase-to-phase voltages, and integrating the phase-to-phase voltages to calculate steady-state magnetic flux between the phases;
   calculating polarity and magnitude of each residual magnetic flux between the phases of the transformer after the circuit breakers shut off the transformer;
detecting voltage-phase between the phases of the transformer and determining a region in which polarity of the steady-state magnetic flux coincides with the polarity of the residual magnetic flux; and
   causing the circuit breakers to close simultaneously in an area where each of the region between the three phases overlaps with each other, thereby suppressing a magnetizing inrush current occurring at the start of energizing of the three-phase transformer.

19. A magnetizing inrush current suppression method for a three-phase transformer having primary windings Y-connected and secondary windings or tertiary windings any of which are Δ-connected, the transformer being connected to a three-phase power supply via circuit breakers coupled with each of three phases to interrupt power supplying to the transformer, the method comprising the steps of:
   measuring voltages of the three phases on the primary windings side obtained when AC voltage is applied in a steady state to the three phases of the transformer;
   calculating steady-state magnetic flux of each of the three phases by integrating the voltages of the three phases, and converting the steady-state magnetic flux of the three phases into steady-state magnetic flux between the phases;
   calculating polarity and magnitude of residual magnetic flux between the phases after the circuit breaker shuts off the transformer;
   detecting voltage-phase between the phases of the transformer and determining a region in which polarity of the steady-state magnetic flux coincides with the polarity of the residual magnetic flux; and
   causing the circuit breakers to close simultaneously in an area where each of the region between the three phases overlaps with each other, thereby suppressing a magnetizing inrush current occurring at the start of energizing of the three-phase transformer.

20. A magnetizing inrush current suppression method for a three-phase transformer, having primary windings Y-connected and secondary windings or tertiary windings any of which are Δ-connected, the transformer being connected to a three-phase power supply via circuit breakers coupled with each of three phases to interrupt power supplying to the transformer, the method comprising the steps of:
   measuring phase-to-phase voltages of the three phases on the primary windings side obtained when AC voltage is applied in a steady state to the three phases of the transformer;
   calculating steady-state magnetic flux between the phases of the transformer by integrating the phase-to-phase voltages;
   calculating polarity and magnitude of residual magnetic flux between the phases of the transformer after the circuit breakers shut off the transformer;
   detecting voltage-phase between the phases of the transformer and determining a region in which polarity of the steady-state magnetic flux coincides with the polarity of the residual magnetic flux; and
   causing the circuit breakers to close simultaneously in an area where each of the region between the three phases overlaps with each other, thereby suppressing a magnetizing inrush current occurring at the start of energizing of the three-phase transformer.

21. A magnetizing inrush current suppression method for a three-phase transformer, having primary windings Y-connected and secondary windings or tertiary windings any of which are Δ-connected, the transformer being connected to a three-phase power supply via circuit breakers coupled with each of three phases to interrupt power supplying to the transformer, the method comprising the steps of:
   measuring phase-to-ground voltages of the three phases on the secondary or tertiary windings side Δ-connected obtained when AC voltage is applied in a steady state to the three phases of the transformer;
   calculating steady-state magnetic flux between the phases of the transformer by integrating the phase-to-ground voltages;
   calculating polarity and magnitude of residual magnetic flux between the phases of the transformer after the circuit breakers shut off the transformer; and
   detecting voltage-phase between the phases of the transformer and determining a region in which polarity of the steady-state magnetic flux coincides with the polarity of the residual magnetic flux; and
   causing the circuit breakers to close simultaneously in an area where each of the region between the three phases overlaps with each other, thereby suppressing a magnetizing inrush current occurring at the start of energizing of the three-phase transformer.

22. The magnetizing inrush current suppression method for a three-phase transformer according to any one of claims 18 to 21, wherein a zero point where the phase-to-phase voltage transits from same polarity to reverse polarity of the residual magnetic flux between the phases of which the residual magnetic flux is largest is taken as an electrical closing target to cause simultaneous closing of the three-phase circuit breaker.

23. The magnetizing inrush current suppression method for a three-phase transformer according to claim 22, wherein the zero point is converted into the voltage-phase of each phase of the transformer, and the voltage-phase is taken as an electrical closing target to cause simultaneous closing of the three-phase circuit breaker.

24. A magnetizing inrush current suppression method for a three-phase transformer, having primary windings Y-connected and secondary windings or tertiary windings any of which are Δ-connected, the transformer being connected to a three-phase power supply via circuit breakers coupled with each of three phases to interrupt power supplying to the transformer, the method comprising the steps of:
   determining in advance a relation between shutoff phase of the circuit breaker and residual magnetic flux of the transformer from a voltage obtained by performing an operation to open the circuit breakers at least once and measured by a measuring device connected to the primary, the secondary, or the tertiary windings side of the transformer;

estimating the residual magnetic flux of the transformer from the relation by controlling the opening phase of the circuit breaker such that the shutoff phase is always the same when the circuit breaker shuts off the transformer;

calculating steady-state magnetic flux between the three phases of the transformer by integrating each phase-to-phase voltage of the three phases on the primary, the secondary, or the tertiary windings side obtained when AC voltage is applied in a steady state to the three phases of the transformer;

detecting voltage-phase between the three phases of the transformer and determining a region in which polarity of the steady-state magnetic flux coincides with polarity of the residual magnetic flux; and causing the circuit breakers to close simultaneously in an area where each region between the three phases overlaps with each other, thereby suppressing a magnetizing inrush current occurring at the start of energizing of the three-phase transformer.

25. The magnetizing inrush current suppression method for a three-phase transformer according to claim 24, wherein a zero point where the phase-to-phase voltage transits from same polarity to reverse polarity of the residual magnetic flux between the phases of which the residual magnetic flux is largest is taken as an electrical closing target to cause simultaneous closing of the three-phase circuit breaker.

26. The magnetizing inrush current suppression method for a three-phase transformer according to claim 25, wherein the zero point is converted into voltage-phase of each phase of the transformer, and the voltage-phase is taken as an electrical closing target to cause simultaneous closing of the three-phase circuit breaker.

27. A magnetizing inrush current suppression method for a three-phase transformer installed in an isolated neutral system, having primary windings Δ-connected and secondary windings or tertiary windings any of which are Δ-connected, the transformer being connected to a three-phase power supply via circuit breakers coupled with each of three phases to interrupt power supplying to the transformer, the method comprising the steps of:

measuring voltages of the three phases on the primary windings side obtained when AC voltage is applied in a steady state to the three phases of the transformer;

calculating zero-phase voltages of the three phases by figuring out a total sum of phase-voltages of the three phases and dividing the total sum one-third;

calculating voltages of the primary, the secondary, and the tertiary windings side of the three phase transformer by subtracting the zero-phase voltages from the phase voltages of the three phases;

calculating steady-state magnetic flux of the primary, the secondary, and the tertiary windings side of the three phase transformer by integrating the voltages of the primary, the secondary, and the tertiary windings side;

calculating polarity and magnitude of residual magnetic flux of the primary, the secondary, and the tertiary windings side of the transformer after the circuit breakers shut off the transformer;

detecting voltage-phases of the primary, the secondary, and the tertiary windings side of the transformer and determining a region in which polarity of the steady-state magnetic flux coincides with polarity of the residual magnetic flux; and causing the circuit breakers to close simultaneously in an area where each region of the primary, the secondary, and the tertiary windings side overlaps with each other, thereby suppressing a magnetizing inrush current occurring at the start of energizing of the three-phase transformer.

28. A magnetizing inrush current suppression method for a three-phase transformer installed in an isolated neutral system, having primary windings Δ-connected and secondary windings or tertiary windings any of which are Δ-connected, the transformer being connected to a three-phase power supply via circuit breakers coupled with each of three phases to interrupt power supplying to the transformer, the method comprising the steps of:

measuring phase-to-phase voltages of the three phases on the secondary or the tertiary windings side Δ-connected obtained when AC voltage is applied in a steady state to the three phases of the transformer;

calculating steady-state magnetic flux of the primary, secondary and tertiary windings side of the transformer by integrating the phase-to-phase voltages;

calculating polarity and magnitude of residual magnetic flux of each windings side of the transformer after the circuit breakers shut off the transformer; and detecting voltage-phase of each windings side of the transformer and determining a region in which polarity of the steady-state magnetic flux coincides with the polarity of the residual magnetic flux; and causing the circuit breakers to close simultaneously in an area where each region of the primary, secondary and tertiary windings sides between the three phases overlaps with each other.

29. A magnetizing inrush current suppression device for a three-phase transformer having primary windings Y-connected and secondary windings or tertiary windings any of which are Δ-connected, the transformer being connected to a three-phase power supply via circuit breakers coupled with each of the three phases to interrupt power supplying to the transformer, the device comprising:

a first calculation part which is connected to the three phases and calculates steady-state magnetic flux between the three phases of the transformer by integrating each voltage or phase-to-phase voltage of the three phases on the primary, the secondary, or the tertiary windings side obtained when AC voltages is applied in a steady state to the three phases of the transformer;

a second calculation part which is connected to the three phases at any of the primary, the secondary, or the tertiary windings side of the transformer and calculates polarity and magnitude of each residual magnetic flux between the three phases of the transformer after the circuit breakers shut off the transformer;

a phase detection part which detects voltage-phase between the three phases of the transformer, determines a region in which polarity of the steady-state magnetic coincides with polarity of the residual magnetic flux, and further determines an area where each region between the three phases overlaps with each other; and a closing part which causes the circuit breakers to close simultaneously in the area determined by the phase detection part, thereby suppressing a magnetizing inrush current occurring at the start of energizing of the three-phase transformer.

30. A magnetizing inrush current suppression device for a three-phase transformer having primary windings Y-connected and secondary windings or tertiary windings any of which are Δ-connected, the transformer being connected to a three-phase power supply via circuit breakers coupled with each of the three phases to interrupt power supplying to the transformer, comprising:

a first calculation part which is connected to the three phases and calculates steady-state magnetic flux between the three phases of the transformer by integrating phase-to-phase voltages of the three phases on the primary, the secondary, or the tertiary windings side obtained when AC voltage is applied in a steady state to the three phases of the transformer;

a second calculation part which is connected to the three phases at any of the primary, the secondary, or the tertiary windings side of the transformer and calculates polarity and magnitude of residual magnetic flux between the phases of the transformer after the circuit breaker shuts off the transformer a measuring and data-holding part which determines in advance a relation between the shutoff phase of the circuit breakers and the residual magnetic flux of the transformer from a voltage obtained by performing an operation to open the circuit breakers at least once and measured by a measuring device connected to the primary, the secondary, or the tertiary windings side of the transformer;

an opening phase control part which controls opening phase of the circuit breakers such that the shutoff phase is always the same when the circuit breakers shut off the transformer;

an output part which outputs an opening command to the circuit breakers through an output from the opening phase control part;

a phase detection part which detects voltage-phase between the phases of the three phases of the transformer, determines a region in which polarity of the steady-state magnetic coincides with polarity of the residual magnetic flux, and further determines an area where the region each of the region between the three phases overlaps with each other; and causing the circuit breakers to close simultaneously in an area where each of the region between the three phases overlaps with each other.

* * * * *